US009349254B1

(12) United States Patent
Hedge, Jr. et al.

(10) Patent No.: US 9,349,254 B1
(45) Date of Patent: May 24, 2016

(54) NO DEALER HAND 21 / PROPOSITIONS AND JACKPOTS

(71) Applicant: J. Richard Hedge, Jr., Chandler, AZ (US)

(72) Inventors: J. Richard Hedge, Jr., Chandler, AZ (US); Aviva R. Hedge, Chandler, AZ (US)

( * ) Notice: Subject to any disclaimer, the term of this patent is extended or adjusted under 35 U.S.C. 154(b) by 0 days.

(21) Appl. No.: 14/121,718

(22) Filed: Oct. 10, 2014

Related U.S. Application Data

(63) Continuation-in-part of application No. 13/573,452, filed on Sep. 14, 2012, now abandoned.

(51) Int. Cl.
*A63F 13/00* (2014.01)
*G07F 17/32* (2006.01)
*A63F 1/00* (2006.01)

(52) U.S. Cl.
CPC .............. *G07F 17/3293* (2013.01); *A63F 1/00* (2013.01); *G07F 17/3244* (2013.01); *A63F 2001/003* (2013.01)

(58) Field of Classification Search
CPC ....... G07F 17/32; G07F 17/3267; A63F 1/00; A63F 1/16; A63F 2001/003
USPC ................................. 463/11-13, 21; 273/292
See application file for complete search history.

(56) References Cited

U.S. PATENT DOCUMENTS

| | | | | |
|---|---|---|---|---|
| 8,747,203 | B1 * | 6/2014 | Hedge et al. | 463/11 |
| 2005/0051963 | A1 * | 3/2005 | Snow | 273/292 |
| 2008/0067745 | A1 * | 3/2008 | Wikstrom | 273/292 |
| 2009/0258689 | A1 * | 10/2009 | Hedge et al. | 463/12 |
| 2013/0059636 | A1 * | 3/2013 | Hedge et al. | 463/12 |

OTHER PUBLICATIONS

Practical Casino Math: by Robert C. Hannum & A.N. Cabot Institute for the study of Gambling & Commercial Gaming RenoNV89557 Copyright (c) 2005 Trace Publications, Second Edition See Attached; Exhibit #1.

(Continued)

*Primary Examiner* — Allen Chan

(57) ABSTRACT

The Applicants provide a process for playing "NDH/21." Their inventive processes utilize both Standard decks of Fifty-two cards or any of several types of acceptably configured decks, such as; over Fifty-two cards (Jokers included) as well as under Fifty-two cards (a.k.a., Carnival or Spanish decks, etc., with or without Joker-cards) and/or the electronic simulation of all the like. This process is inclusive to an encompassing video gaming apparatus or a live action table gaming environment, as accommodated for. In play action, the Dealer's Hand is replaced, with the application of a triggering thread of numbers, ranging from Twelve up to Twenty-One. Through such a design, the Applicants present Housemasters with uniquely exploitable degrees of volatility; meaning a tolerable Player vigorish is in store, one that Players won't quickly shy away from. In so doing, the Applicants' triggering means solution replacing the Dealer's Hand in play action proffers a whole new frontier for their "Blackjack/21" gaming procedure. Indeed, this procedure directly features significantly fatter core margin payoffs for winning hands while still providing for all the necessary elements of a sustainable alternative to the classic Blackjack workhorse for which both Housemasters, and the public, can enthusiastically embrace.

7 Claims, 17 Drawing Sheets

(56) References Cited

OTHER PUBLICATIONS

Optimal Play: by Stewart Ethier & William Eadington Institute for the Study of Gambling & Commercial GaminRenoNV89557 Copyright (c) 2007 ISG & CG Publications, First Edition See Attached; Exhibit #2.

Blackjack Attack: Playing the Pros' Way; The Ultimate Weapon Copyright (c) 2005 by Don Schlesinger, Third Edition See Attached; Exhibit #3.

Draw 21: Mathematical Anaylsis. by Stanley Ko Copyright (c) 2008 See Attached.

Draw 21 Mathematical Analysis by Stanley Ko Copyright 2008 See Attached.

* cited by examiner

COUNSEL I

Fig. 9a

*HOW TO PLAY:*

Player books contract wager(s) in the "Base" of the Game. Players are dealt Two (2) cards one at a time. Next, any first Two-card winning hand-counts are settled immediately with possible re-plays being made. Then a decision is made, as to play-out their hand(s) in the "Base" action or move to the "Prop-Box." Players may draw cards until their best possible hand is made to "Stand Pat" against the applied pay tables.

*RULES:*

Players can "Surrender" for a resulting "Stand off."

No Surrender "On the Trigger". No "back-to-back Surrender."

No Surrender after Third (3rd) card is drawn. No Surrender upon a "Newly Progressed" wager.

Players lose "Ante" wager Side-bets when Surrendering.

Players can Split any paired cards: Once per hand. Players can Double Down on: Any Two (2) cards.

Players can Double Down on any Split cards: One (1) card to Ten's & Ace's.

Players can Parlay-Split & re-play *"post-paid"* hands of: paired Tens & Ace-Ten for Match play, Double and/or Triple Down actions; the Player then draws One (1) new card for each new hand at risk.

Players can engage either type of CDM plays, upon any unrestricted hands.

*WHEN JOKER CARDS ARE APPLIED:* The player's first Joker(s) to-show is "held" for future play.

Upon seeing a new hole-count hand, Players can elect to redeem a "held Joker card," at least Double Down upon their initial wager, then draw card(s). If, a new Joker shows before busting, it's an automatic winner.

Jokers that show in a new hole-count hand with an "Ace," win instantly, with the Joker being held for reuse.

CDM's & JCDM's may function differently. Paytable regimes including: Triggering means, dictate all payoffs.

All hand count tallies "Standing Pat" *short* of the First (1st) Triggering Number being used are "Sacked."

All hand count tallies *over* Twenty-One (21) are "Busted."

*SIDE-BETS:*

All first Two (2) & first Three (3) card, "Ante" type side-bet wagers are displayed tableside with their scales for "Bonus Payoffs."

A Joker's Jackpot is ONLY winnable with an outcome of "21," regarding either type of CDM or JCDM play.

---

*PRIMARY "BASE" PLAY ACTION:*

WINNING HANDS, PUSH HANDS & STANDING "PAT"

*PRIMARY "PUSH" NUMBER FOR THIS "BASE" PLAY ACTION IS: 19*

*PRIMARY "TRIGGER" NUMBERS FOR THIS "BASE" PLAY ACTION ARE: 17 & 18*

*WINNING NUMBER TALLY'S:*

IF: Players "Stand Pat" with a hand of; BLACKJACK. THEN: Players are "Winners & MAY re-play cards."

SO: Players are paid; 2 to 1, or 3 to 2 if, "TWENTY-ONE" is tallied with three or more cards.

IF: Players "Stand Pat" with a hand of; TWENTY. THEN: Players are "Winners & MAY re-play cards."

SO: Players are paid; 6 to 5 on Ace+9/TWENTY or EVEN, on all other hand tallies totaling: TWENTY.

*(CONTINUED IN FIG. 9b)*

*PUSH NUMBER TALLY'S:*

IF: Players "Stand Pat" with a hand of; NINETEEN. THEN: Players "Push."

SO: Players don't "win or lose" for the hand.

*Fig. 9b*

*TRIGGER NUMBER TALLY'S:*

IF: Players "Stand Pat" with hand of; "18." THEN: Players are "On the Trigger."

SO: Players lose; 50% of their contract wagers on "18."

IF: Players "Stand Pat" with hand of; "17." THEN: Players are "On the Trigger."

SO: Players lose; 50% of their contract wagers on "17."

*LOSING HAND TALLY'S:*

IF: Players draw and "Stands Pat-upon" a hand count tally of; 12 thru 16. THEN: Players are "Sacked."

SO: Players lose; Up-to, 100% of their *total* contract wager. Players are "Busted" over 21.

---

*SECONDARY "BASE" PLAY ACTION:*

DOUBLING DOWN, DOUBLING ON SPLIT CARDS, OR QUALIFYING FOR CDM'S & JACKPOTS

*SECONDARY "PUSH" NUMBER FOR THIS "BASE" PLAY ACTION IS: 19*

*SECONDARY "TRIGGER" NUMBERS FOR DOUBLE DOWN ACTIONS ARE: 16-17-18.*

*WINNING NUMBER TALLY'S:*

IF: Players draw to "Double Down" hand of; TWENTY ONE. THEN: Players are "Winners."

SO: Players are paid; 3 to 2.

IF: Players draw to "Double Down" hand of; TWENTY. THEN: Players are "Winners."

SO: Players are paid; 1 to 1.

*PUSH NUMBER TALLY:*

IF: Players draw to "Double Down" hand of; NINETEEN. THEN: Players "Push."

SO: players don't win or lose.

*TRIGGER NUMBER TALLY'S:*

IF: Players draw 3rd card only to; "18". THEN: Players keep; 50% of their *total* wager.

IF: Players draw 3rd card only to; "17". THEN: Players keep; 50% of their *total* wager.

IF: Players draw 3rd card only to; "16". THEN: Players keep; 20% of their *total* wager.

*LOSING HAND & DOUBLE DOWN TALLY'S:*

IF: Players draw an "Stands Pat-upon" a hand count tally of; 12 thru 15. THEN: Players are "Sacked."

SO: Players lose; Up-to, 100% of their *total* contract wager. Players are "Busted" over 21.

*DRAWING CARDS IN THE "BASE" FOR CDM'S & JOKER'S JACKPOTS:*

IF: Players draw INITIAL hand count tallies of; ≤10 or Any Stiff hands 12 thru 16.

THEN: Players can draw or Split and draw cards for either, CDM and the Joker's Jackpot too.

SO: Players Win according to "posted" pay tables and Jackpot rules.

Players must draw to exactly "21" to win the Joker's Jackpot!

COUNSEL II

*Fig.10a*

*HOW TO PLAY:*

Player books contract wager(s) in the "Base" of the Game. Players are dealt Two (2) cards one at a time.
Next, any first Two-card winning hand-counts are settled immediately with possible re-plays being made.
Then a decision is made, as to play-out their hand(s) in the "Base" action or move to the "Prop-Box."
Players may draw cards until their best possible hand is made to "Stand Pat" against any applied paytables.

*RULES:*

No "Surrender".
Players can "Double Down" for "Base" play action upon: Any Two (2) cards.
Players can Match play, Double or Triple Down for Propositions' play action upon: Any Two (2) cards.
Players can Split and Multi-Down on any paired cards: One (1) card to Ace's.
Players can Parlay-Split & Re-play *"post-paid"* hands of: paired Tens & Ace-Ten for Match play, Double and/or Triple Down actions; the player then draws typically One (1) new card for each new hand at risk.
Players can engage either type of CDM plays, upon any unrestricted hands.
*WHEN JOKER CARDS ARE APPLIED:* The Player's first Joker(s) to-show is "held" for future play.
Upon seeing a new hole-count hand, Players can elect to redeem a "held Joker card," at least Match Play upon their initial wager, then draw card(s). If, a new Joker shows before busting, it's an automatic winner.
Jokers that show in a new hole-count hand with an "Ace," win instantly, with the Joker being held for reuse.
CDM's & JCDM's may function differently. Paytable regimes including: Triggering means, dictate all payoffs.
All hand count tallies "Standing Pat" *short* of the First (1st) Triggering Number being used are "Sacked."
All hand count tallies *over* Twenty-One (21) are "Busted".

*SIDE-BETS:*

All first Two (2) card & Three (3) card, "Ante" type side-bet wagers are
displayed tableside with their scales for "Bonus Payoffs".
A Joker's Jackpot is ONLY winnable with an outcome of "21," regarding either type of CDM or JCDM play.

*PRIMARY "BASE" PLAY ACTION:*
WINNING HANDS, PUSH HANDS & STANDING "PAT"

*PRIMARY "PUSH" NUMBER FOR THIS "BASE" PLAY ACTION IS: 19*

*PRIMARY "TRIGGER" NUMBERS FOR THIS "BASE" PLAY ACTION ARE: 17 & 18*

*WINNING NUMBER TALLY'S:*

IF: Players "Stand Pat" with a hand of; BLACKJACK. THEN: Players are "Winners."
SO: Players are paid: 2 to 1, or 3 to 2 if, TWENTY ONE is tallied with three or more cards.

IF: Players "Stand Pat" with a hand of; TWENTY. THEN: Players are "Winners."
SO: Players are paid: 1 to 1.

IF: Players "Stand Pat" with a hand of: NINETEEN. THEN: Players are "short-Winners."
SO: Players are paid; 50% of their contract wagers total, on NINETEEN.

*(CONTINUED IN FIG. 10b)*

Fig.10b

*TRIGGER NUMBER TALLY'S:*

IF: Players "Stand Pat" with hand of; "18." THEN: Players are "On the Trigger."

SO: Players keep; 50% of their contract wagers on "18."

IF: Players "Stand Pat" with hand of; "17." THEN: Players are "On the Trigger."

SO: Players keep; 50% of their contract wagers on "17."

*LOSING HAND TALLY'S:*

IF: Players draw and "Stands Pat-upon" a hand count tally of; 12 thru 16. THEN: Players are "Sacked."

SO: Players lose; 100% of their *total* contract wager. Players are "Busted" over 21.

---

*SECONDARY "BASE" PLAY ACTION:*

DOUBLING DOWN, DOUBLING ON SPLIT CARDS OR QUALIFYING FOR CDM'S & JACKPOTS

*SECONDARY "PUSH" NUMBER FOR THIS "BASE" PLAY ACTION IS: 19*

*SECONDARY "TRIGGER" NUMBERS FOR DOUBLE DOWN ACTIONS ARE: 17 & 18*

*WINNING NUMBER TALLY'S:*

IF: Players draw to "Double Down" hand of; TWENTY ONE. THEN: Players are "Winners."

SO: Players are paid: 3 to 2.

IF: Players draw to "Double Down" hand of; TWENTY. THEN: Players are "Winners."

SO: Players are paid: 1 to 1.

*PUSH NUMBER TALLY:*

IF: Players draw to "Double Down" hand of; NINETEEN. THEN: Players "Push."

SO: Players don't win or lose.

*TRIGGER NUMBER TALLY'S:*

IF: Players draw 3rd card only to; "18." THEN: Players keep; 50% of their *total* wager.

IF: Players draw 3rd card only to; "17." THEN: Players keep; 50% of their *total* wager.

*LOSING HAND & DOUBLE DOWN TALLY'S:*

IF: Players draw and "Stands Pat-upon" a hand count tally of; 12 thru 16. THEN: Players are "Sacked."

SO: Players lose; 100% of their *total* contract wager. Players are "Busted" over 21.

*DRAWING CARDS IN THE "BASE" FOR CDM'S & JOKER'S JACKPOTS:*

IF: Players draw INITIAL hand count tallies of; ≤ 10 or Any Stiff hands 12 thru 16.

THEN: Players can draw or Split and draw cards for either, CDM and the Joker's Jackpot too.

SO: Players Win according to "posted" pay tables and Jackpot rules.

Players must draw to exactly "21" to win the Joker's Jackpot!

*(CONTINUED IN FIG. 10c)*

*<u>SECONDARY "PROPOSITIONS BOX" PLAY ACTION:</u>* *5%* *COMMISSION OR RAKE ON WINNERS*
DOUBLING DOWN, DOUBLING DOWN ON SPLIT CARDS OR QUALIFYING FOR CDM'S & JACKPOTS

*SECONDARY "PUSH" NUMBER FOR "PROPOSITION" PLAY ACTION IS: 19*

*SECONDARY "TRIGGER" NUMBER FOR "PROPOSITION" PLAY ACTIONS IS: 18*

*<u>WINNING NUMBER TALLY'S:</u>*

IF: Players draw to "Double Down" hand of; TWENTY ONE. THEN: Players are "Winners."

SO: Players are paid; 2 to 1.

IF: Players draw to "Double Down" hand of; TWENTY. THEN: Players are "Winners."

SO: Players are paid; 6 to 5.

*Fig.10c*

*<u>PUSH NUMBER TALLY:</u>*

IF: Players draw to "Double Down" hand of; NINETEEN. THEN: players "Push."

SO: players don't win or lose.

*<u>TRIGGER NUMBER TALLY:</u>*

IF: Players draw 3rd card only to; "18." THEN: Players keep: 50% of their *total* wager.

*<u>LOSING HAND & DOUBLE DOWN TALLY'S:</u>*

IF: Players draw a hand count tally of; 12 thru 17. THEN: players are "Sacked."

SO: Players lose: 100% of their *total* contract wager. Players are "Busted" over 21.

*<u>SECONDARY "PROPOSITIONS BOX" PLAY ACTION:</u>* *5%* *COMMISSION OR RAKE ON WINNERS*
TRIPLING DOWN; TRIPLING DOWN ON SPLIT CARDS OR QUALIFYING FOR CDM'S & JACKPOTS

*SECONDARY "TRIGGER" NUMBER FOR TRIPLE DOWN ACTIONS ARE: 19*

*<u>WINNING NUMBER TALLY'S:</u>*

IF: Players draw to "Triple Down" hand of; TWENTY ONE. THEN: Players are "Winners."

SO: Players are paid; 2 to 1.

IF: Players draw to "Triple Down" hand of; TWENTY. THEN: Players are "Winners."

SO: Players are paid; 3 to 2.

*<u>TRIGGER NUMBER TALLY:</u>*

IF: Players draw 3rd card only to; "19." THEN: Players keep: 50% of their *total* wager.

*<u>LOSING HAND & TRIPLE DOWN TALLY'S:</u>*

IF: Players draw and "Stands Pat-upon" a hand count tally of; 12 thru 18. THEN: Players are "Sacked."

SO: Players lose; 100% of their *total* contract wager. Players are "Busted" over 21.

*<u>DRAWING CARDS IN THE "PROP-BOX" FOR CDM'S & JOKER'S JACKPOTS:</u>*

IF: Players draw INITIAL hand count tallies of; ≤10 or Any Stiff hands 12 thru 16.

THEN: Players can draw or Split and draw cards for either type of CDM, and the Joker's Jackpot too.

SO: Players Win according to "posted" pay tables and Jackpot rules.

Players must draw to exactly "21" to win the Joker's Jackpot!

COUNSEL III

Fig.11a

*HOW TO PLAY:*

Player books at least One (1) electronic contract wager. Two (2) cards are then revealed for hand at play. Next, any first Two-card winning hand-counts are settled immediately with possible re-plays being made. Then a decision is made, as to play-out their hand(s) in the "Base" action or move to the "Prop-Box." Players may draw cards until their best possible hand is made to "Stand Pat" against the applied pay tables.

*RULES:*

Players can "Surrender" for a resulting "Stand off."

No Surrender "On the Trigger." No "Back-to-Back" Surrender. No Surrender after Third (3rd) card draw.

No Surrender upon a "Newly Progressed" wager. Players lose "Ante" Side-bets when Surrendering.

Players can "Double Down" for "Base" play action upon: Any Two (2) cards.

Players can Split and/or Multi-Down on any paired cards: One (1) card to Ace's.

Players can Match play, Double or Triple Down for Propositions' play action upon: Any Two (2) cards.

Players can Parlay-Split & Re-play *"post-paid"* hands of: paired Tens & Ace-Ten for Match play, Double and/or Triple Down actions, the Player then draws One (1) new card for each new hand at risk.

Players can engage either type of CDM plays, upon any unrestricted hands.

*WHEN JOKER CARDS ARE APPLIED:* The player's first Joker(s) to-show is "held" for future play. Upon seeing a new hole-count hand, Players can elect to redeem a "held Joker card," at least Triple Down upon their initial wager, then draw card(s). If, a new Joker shows before busting, it's an automatic winner. Jokers that show in a new hole-count hand with an "Ace," win instantly, with the Joker being held for reuse.

CDM's & JCDM's may function differently. Paytable regimes including: Triggering means, dictate all payoffs.

All hand count tallies "Standing Pat" *short* of the First (1st) Triggering Number being used are "Sacked."

All hand count tallies *over* Twenty-One (21) are "Busted."

*SIDE-BETS:*

All first Two (2) card & Three (3) card, "Ante" type side-bet wagers are displayed tableside with their scales for "Bonus Payoffs."

A Joker's Jackpot is ONLY winnable with an outcome of "21," regarding either type of CDM or JCDM play.

---

*PRIMARY "BASE" PLAY ACTION:*

WINNING HANDS, PUSH HANDS & STANDING "PAT"

*PRIMARY "PUSH" NUMBER FOR THIS "BASE" PLAY ACTION IS: 18*

*PRIMARY "TRIGGER" NUMBERS FOR THE "BASE" PLAY ACTION ARE: 16 & 17.*

*WINNING NUMERS TALLY'S:*

IF: Players "Stand Pat" with a hand of: BLACKJACK. THEN: Players are "Winners."

SO: Players are paid; 200% over their wager on a 2/card "BLACKJACK" and,

150% over their wager on a "TWENTY-ONE" when made with three or more cards.

IF: Players "Stand Pat" with a hand of; TWENTY. THEN: Players are "Winners."

SO: Players and are paid; 150% over their wager on a 2/card "TWENTY" and,

120% over their wager on a "TWENTY," when made with three or more cards.

*(CONTINUED IN FIG. 11b)*

IF: Players "Stand Pat" with a hand of: NINETEEN. THEN: Players are "short-Winners."

SO: Players are paid; At least, 50% of their contract wager on an outcome of "NINETEEN."

*PUSH NUMBER TALLY:*

IF: Players "Stand Pat" with a hand of: 18. THEN: Players "Push."

SO: Players don't win or lose on "18."

*Fig.11b*

*TRIGGER NUMBER TALLY'S:*

IF: Players "Stand Pat" on a hand of; "17." THEN: Players are "On the Trigger."

SO: Players keeps: 50% of their wager on a "17."

IF: Players "Stand Pat" on a hand of; "16." THEN: Players are "On the Trigger."

SO: Players keeps; 40% of their wager on a "16."

*LOSING HAND TALLY'S:*

IF: Players draw and "Stands Pat-upon" a hand count tally of: 12 thru 15. THEN: Players are "Sacked."

SO: Players lose; 100% of their *total* contract wager. Players are "Busted" over 21.

---

*SECONDARY "BASE" PLAY ACTION:*

DOUBLING DOWN, DOUBLING ON SPLIT CARDS OR QUALIFYING FOR CDM'S & JACKPOTS

*SECONDARY "PUSH" NUMBER FOR "BASE" PLAY ACTION IS: 18*

*SECONDARY "TRIGGER" NUMBERS FOR "BASE" PLAY ACTION IS: 17*

*WINNING NUMBERS TALLY'S:*

IF: Players draw to "Double Down" hand of: TWENTY ONE. THEN: Players are "Winners."

SO: Players are paid: 150% over their wager on a TWENTY ONE, when made with 3/cards.

IF: Players draw to "Double Down" hand of: TWENTY. THEN: Players are "Winners."

SO: Players and are paid: 100% of their wager on a 2/card TWENTY and,
120% over their wager on TWENTY when made with three or more cards.

IF: Players draw to "Double Down" hand of: NINETEEN. THEN: Players are "short-Winners."

SO: Players are paid: 50% over their wager on a NINETEEN, when made with 3/cards.

*PUSH NUMBER TALLY:*

IF: Players draw 3rd card only to; "18." THEN: Players "Push" on all booked wagers.

*TRIGGER NUMBER TALLY:*

IF: Players draw 3rd card only to; "17". THEN: Players keep: 50% of their *total* wager.

*LOSING HAND & DOUBLE DOWN TALLY'S:*

IF: Players draw a hand count tally of; 12 thru 16. THEN: Players are "Sacked."

SO: Players lose: 100% of their *total* contract wager. Players are "Busted" over 21.

*DRAWING CARDS IN THE "BASE" FOR CDM'S & JOKER'S JACKPOTS:*

IF: Players draw INITIAL hand count tallies of; ≤10 or Any Stiff hands 12 thru 16.

THEN: Players can draw or Split and draw cards for either, CDM and the Joker's Jackpot too.

SO: Players Win according to "posted" pay tables and Jackpot rules.

Players must draw to exactly "21" to win the Joker's Jackpot! *(CONTINUED IN FIG. 11c)*

*SECONDARY "PROPOSITIONS BOX" PLAY ACTION:* *5%* *COMMISSION OR RAKE ON WINNERS*
DOUBLING DOWN, DOUBLING DOWN ON SPLIT CARDS OR QUALIFYING FOR CDM'S & JACKPOTS

*SECONDARY "PUSH" NUMBER FOR "PROPOSITION" PLAY ACTION IS: 19*

*SECONDARY "TRIGGER" NUMBER FOR "PROPOSITION" PLAY ACTIONS IS: 18*

*WINNING NUMBER TALLY'S:*

IF: Players draw to "Double Down" hand tally of; TWENTY ONE. THEN: Players are "Winners."

SO: Players are paid: 200% over their *total* contract wager.

IF: Players draw to "Double Down" hand tally of; TWENTY. THEN: Players are "Winners."

SO: Players are paid; 120% over their *total* contract wager.

*PUSH NUMBER TALLY:*

IF: Players draw to "Double Down" hand of; NINETEEN. THEN: Players "Push."

SO: Players don't win or lose.

*Fig. 11c*

*TRIGGER NUMBER TALLY:*

IF: Players draw 3rd card only to; "18." THEN: Players keep: 50% of their *total* wager.

*LOSING HAND & DOUBLE DOWN TALLY'S:*

IF: Players draw a hand count tally of; 12 thru 17. THEN: players are "Sacked."

SO: Players lose; 100% of their *total* contract wager. Players are "Busted" over 21.

---

*SECONDARY "PROPOSITIONS BOX" PLAY ACTION:* *5%* *COMMISSION OR RAKE ON WINNERS*
TRIPLING DOWN, TRIPLING DOWN ON SPLIT CARDS OR QUALIFYING FOR CDM'S & JACKPOTS

*SECONDARY "TRIGGER" NUMBER FOR TRIPLE DOWN ACTIONS ARE: 19*

*WINNING NUMBER TALLY'S:*

IF: Players draw to "Triple Down" hand of: TWENTY ONE. THEN: Players are "Winners."

SO: Players are paid: 200% over their *total* contract wager.

IF: Players draw to "Triple Down" hand of: TWENTY. THEN: Players are "Winners."

SO: Players are paid; 150% over their *total* contract wager.

*TRIGGER NUMBER TALLY:*

IF: Players draw 3rd card only to: "19." THEN: Players keep; 50% of their *total* wager.

*LOSING HAND & TRIPLE DOWN TALLY'S:*

IF: Players draw and "Stands Pat-upon" a hand count tally of 12 thru 18. THEN: Players are "Sacked."

SO: Players lose; 100% of their *total* contract wager. Players are "Busted" over 21.

*DRAWING CARDS IN THE "PROP-BOX" FOR CDM'S & JOKER'S JACKPOTS:*

IF: Players draw INITIAL hand count tallies of: ≤10 or Any Stiff hands 12 thru 16.

THEN: Players can draw or Split and draw cards for either type of CDM, and the Joker's Jackpot too.

SO: Players Win according to "posted" pay tables and Jackpot rules.

Player must draw to exactly "21" to win the Joker's Jackpot!

NO DEALER HAND 21 / PROPOSITIONS AND JACKPOTS

CROSS-REFERENCE TO RELATED APPLICATIONS

This is a Continuation-in-part of Ser. No. 12/798,864, filed; 13 Apr. 2010, now; U.S. Pat. No. 8,308,540.

TRADEMARK NOTIFICATIONS

This application contains several Trademarks for which the Applicants maintain their exclusive rights, to usage thereof.

FIELD OF INVENTION

This invention relates to games of chance as historically identified with wagering in casinos. The Applicants' methods and modifications are inclusive to both a variety of live action table gaming formats as well as electronic display applications for play of all types. Their inventive processes utilize both; Standard decks of Fifty-two (52) cards or any of several differing types of acceptably configured decks, such as; over Fifty-two cards (Jokers included) as well as under Fifty-two cards (a.k.a., Carnival or Spanish decks, etc.) and/or the electronic simulation of all the like, to be specific.

As such, the Applicants' process in allowing Housemasters (i.e. casino management) the ability to apply such a variety of decks is for the direct purpose of; expanding, contracting, and/or otherwise manipulating the core operating margin variances from the usage of such decks, thereby benefitting their game's broader productive utility. More importantly, the present invention utilizes a process formulated upon the "absence of an operative dealer's hand" throughout the games course of play, regardless of the quantity and numerical make up of such deck(s) of playing cards being used.

Therefore, notwithstanding the various playing card configurations being applied, the absence of the dealer's hand or no dealer hand (NDH), in play is without precedent and the principle creative action to be focused upon in contrast to the traditional play of Blackjack in all of its present day forms and permutations. In so teaching, the Applicants' methods proffer a whole new outcome of opportunity for "21" play; within the Applicants applied industry of casino gaming.

Moreover, a very quick, simplistic method of card play is provided for Players looking for a fun, entertaining time wherein a reasonable chance of winning may be had. Presently, the Applicants know of no previously established methodologies regarding either "live action" table game embodiments of Blackjack/21, including those banked by a House (casino) or electronic "virtual reality" display methods of Blackjack/21 either with or without dealers, which are presently under Patent enforcement or otherwise that might be construed as teaching on or reading upon their concepts and process of play.

DESCRIPTION OF PRIOR ART

Blackjack is a centuries old game and historically a premier table game in American casinos as well as casinos across the world. No doubt there is good reason for this. America and the world love card games; and they know this game—Blackjack!

Actually, it's a love/hate relationship; just ask anyone who plays the game. People love to play Blackjack especially when the cards give, and of course take, yet no one in any language enjoys getting slaughtered when the dealer stays so "hot" that just simply nothing the Player does is right! So, before the disclosure of the Applicants' alternative methodologies, a basic discussion regarding Blackjack's traditional play along with its terminology and historical trends is useful in teaching the Applicants' inventive process as described and illustrated further below.

Simply put, the objective in traditional Blackjack is to beat the dealer's hand. This is accomplished by having a totality of cards that tally (i.e. count) higher than the dealer's cards without going over Twenty-one (21).

Card values in Blackjack are as follows: The Two (2) through Ten (10) Pip-cards are tallied at face value while "Face cards" are valued at Ten (10) and Aces are valued at Eleven (11) or One (1). Likewise, from here forward, the term "Ten card" will define both Ten (10) Pip-cards and/or Jack, Queen & King cards (a.k.a., Court cards).

Similarly, a "Blackjack" hand is always made up of the first two cards dealt. These cards being a Ten card and an Ace. The Blackjack hand is also referred to as a "Natural" or when made with Three (3) or more cards, a "21," and is just as generally unbeatable.

Although, the dirty fact of the game is that a dealer's dealt Blackjack hand will frequently drive a simultaneously dealt Player's Blackjack hand into an even money decision or at the very least, a "Push" stand off outcome for the Player's Blackjack hand; meaning the Players hand doesn't win or lose. Likewise, a dealer hand 21 made with Three (3) or more cards, will always Push all other Player hand 21's made with Three (3) or more cards. As a practical matter, a Player can win with any total under 21 so long as the dealer "Busts" first.

Busting in Blackjack/21 is any final tally higher than Twenty-One (21) for either the Player's or the dealer's hand. However, unlike the dealer, Players will experience the "Double Bust." The Double Bust occurs when a Player's hand Busts-out first, followed by the dealer Busting.

It is this constant reality of the Double Bust which Players are intractably facing in Blackjack that gives the casino its greatest most frequently exercised "House Percentage Advantage" (a.k.a., "Vig." or Vigorish) over the Players. It is known that the dealer will Bust 28% of the time. However, only the Players can experience the Double Bust because the Players must act first!

All things being equal, Double Busting provides the House with a constant 5.7% advantage over the Players when Double Busting occurs. Therefore, any way you play it within the confines of all "traditional dealer hand methods and rules" for playing Blackjack/21, there remains a powerful House advantage being exacted against all Players within the traditional rules of Blackjack, which must be constantly evaded.

This House advantage is the Double Bust effect.

Additional aspects of traditional Blackjack play include the terminology of "Hard," "Stiff," "Soft" and "Pat" hands. A Hard hand is one that either does not have an Ace i.e., 9-7/16 or, if it does, it tallies/counts as a One (1), 9-6-A/16. Typically, the Hard hand totaling Twelve (12) thru Sixteen (16) is also called a Stiff hand because it can easily Bust when drawing additional cards.

A Soft hand is one that has an Ace being tallied as Eleven (11) amongst the first Two (2) cards being dealt: A-6/17, A-7/18, A-8/19 or A-9/20. Regardless whether the Player's hand stands made upon a Hard or Soft 17, 18, 19 or 20, such hands are thought of as "Pat hands." The next two general strategies of traditional Blackjack play include card "Splitting" and/or "Doubling Down," both practices of which Players are well advised to partake of though tableside restrictions will vary from House to House.

Most often when Players engage the practice of card Splitting & Doubling down, the decision is simply weighed against the dealer's "Up-card". Should the dealer's Up-card be a Bust card; 2, 3, 4, 5 or 6, this often inclines the Player to Split their paired cards, such as; 2's, 3's, 4's,-6's, 7's, 8's, 9's or Aces, when they otherwise may not.

This scenario facilitates a great Splitting opportunity, or better yet as paired Aces reveal, a fantastic multiple Double Down action against a dealer's weak Up-card; although Players may draw out as many cards as necessary in a match play Splitting situation until they either Stand Pat or Busts! Similarly, when Splitting Aces, many casinos allow only One (1) card for each Split Ace and generally the Player can only Split Aces once under traditional Nevada rules of play!

In further regards to Doubling Down, again it's a good idea to Double Down whenever the opportunity arises. Although, Doubling Down is sometimes restricted to a Player's first Two (2) cards tallying Ten (10) or Eleven (11) only. Moreover, many restrictive rules especially those pertaining to Splitting & Doubling Down are put into place by Housemasters as a means to maintain a desired core operating margin position for their Blackjack games, thereby benefiting their casinos. Therefore, these rules will vary based on many subserviently subjective factors. Additional subservient factors are found within the "Insurance & Surrender" rules as historically applied.

Traditionally, Insurance is offered when the dealer's Up-card is an Ace. For the unwashed, Insurance is generally thought of as a "bad bet" but, does protect the Player's wager in the event the dealer has a Blackjack in-the-hole, with a Ten card.

As for the traditional practice of the Surrender rule option (where it is still found), this rule enables the Players to withdraw from the hand for half the original contract wager. This action is taken by Player(s) when it's felt the dealer's hand is so strong (often repeating Up-card Tens & Aces), particularly when the Player is holding a Fifteen (15) or Sixteen (16) Stiff hand, that keeping half the original contract wager is clearly better than losing all of it.

In America today and throughout the world, Insurance is readily found as part of the Blackjack gaming scene where Surrender rules are not so readily found outside of Asia and Europe. The reasons are simple. Insurance is generally thought of as a bad wager for Players to engage in, while Surrendering against continually "strong" dealer hand Up-cards, in a few cases, is a good idea.

Of course, the Surrender action as historically deployed assumes the Player is not motivated to just simply get up and leave . . . .

The above background rendering of traditional Blackjack/21 rule play pretty much covers all the essential bases of Blackjack play, however certainly not all the "basics" of Blackjack play. As such, the Applicants are referring to the qualities of play employed through the application of the "Basic Strategy" play that are not developed herein. Although, Basic Strategy play is written about in a great many topical books regarding Blackjack.

In following, there are two reasons for not discussing Basic Strategy here. First and foremost, there are no "dealer hand" outcomes that impact upon the Applicants' methodologies for play action. And secondly, any Player who is fully immersed in the knowledge of Basic Strategy can easily adjust their play actions accordingly to whatever they see might apply to the Applicants' processes for play.

Having said this, there still remains the speculative issue of card counting as well as the dubious issue of "Ante" wager side betting that has so proliferated the world in recent years.

Card counting is the fastest growing somewhat "under the radar" trend of traditional Blackjack, a trend that is a natural consequence of the voluminous numbers of truly well rounded Basic Strategy Players at large. Moreover, this encroaching advance against the rather thin House advantage of the traditional Blackjack game; via the art of card counting, as spurred on through strong Basic Strategy knowledge, has become so pervasive in recent years that now every Basic Strategy wanting to be an Advanced Strategy or "Advantage Player" around thinks he can beat Blackjack for their weekend job working as card-counting extraordinaires!

However, as the truly strong Advantage Player will tell you, there is a new and rather deleterious trend, in addition to the pre-requisite ability to accurately count down a deck of cards in less than 30 seconds, working around the Blackjack tables of Las Vegas and around the country which is to pay a natural Blackjack at: 6 to 5 over the traditional Blackjack pay off of: 3 to 2.

A single act by Housemasters (that alone) makes beating the House in Blackjack even by a "Ken Uston," were he still alive, all but impossible. This "cynical" Blackjack payoff trend adds another 1.40% in the margin to the house's Vig-advantage where Players actually play and tolerate this. Worse yet, this surreptitiously defensive trend is spreading fast and will prove extremely disadvantageous to both the "stout Blackjack Players" and the more "profligate too-smart-by-half type weekend Players" alike!

Therefore, a general discussion regarding the salient points and trends of card counting is useful in understanding additional motivations of the Applicants' modified methodologies. Effective card counting by way of the professional is steeped in process memorization, including the memorization of fixed strategy tables often referred to as indices of which there are Eighteen (18), plus Four (4) Surrender plays, to be specific.

For example, these indices are memorized strategies counseling within the minds-eye of a basic "Hi-Lo" single level trend count that provides the "edge" that bears the winning advantage so steadily sought after by Blackjack connoisseurs.

The basic Hi-Lo trend count starts at zero upon a new shuffle of a single deck or multi-deck shoe. A shoe is the mechanism from which the dealer advances individual cards up to a multiple of Eight (8) decks. Therefore, unlike Dice or Roulette, Blackjack is made up of a series of "dependent trials" culminating in hands, and then rounds. As such, each "card value" being seen affects the likely outcome of the next card and so on.

So, in assigning numeric count values to cards leaving the shoe, the low cards: 2, 3, 4, 5 or 6 are counted as +1 and all high cards: 10, J, Q, K & Ace are counted as −1. Wherefore, all 7, 8 & 9 cards are ignored being valued at "zero" in the basic Hi-Lo trend count method, while "multi-level" methodologies for example which count some cards as: +2, +3 or even, +4 are significantly more cumbersome for most card counters to learn. However, such skills once acquired are also known to be even more effective especially when a "deep penetration" of the shoe occurs.

Suffice it to say, on the one hand, its been observed that for the "stout" Blackjack Player the main purpose for acquiring the skill and confidence that card counting promises is to know when to "hit" to improve a Stiff hand, increase one's bet spreads or better yet, to pitch the dealer Bust cards from third base when seated at a crowded table.

Although for the largely reckless card counter, what card counting is probably best suited for is avoiding the dreaded Double Bust effect, as well as evaluating both Insurance plays and Surrendering wherever allowed and whenever it's wise.

The fact is these skills alone will save "profligate" weekend Players a bundle against a casino full of scorching hot dealers! On the other hand, for today's professional such basic skills would likely be closely augmented by more precise methodologies like Arnold Snyder's: RED SEVEN or ZEN count methods or the Vancura/Fuchs: KO plus "Ace tracking" methods, both great methods indeed. Or, say Humble & Cooper's: HI-OPT I and HI-OPT II methods, and surely not to be left out Stanford Wong's: HI/LO & "Half-count" methods name just a few, that most Blackjack card counting connoisseurs, Advantage Players, esteem for assuming their mental acuity can remain sharp enough for a long enough sessions of time to make a difference . . . .

In the end, the edge that quality card counting provides is that minds-eye intuitive impetus to "make the play," and for the very rare breed of gambler that strong pulling back counter-intuitive perspective that can seemingly see ahead with 20/20 hindsight!

However, the collateral effects of card counting are summarily undone when either Basic or Advanced Strategy Player mishaps occur . . . . Typically impacting somewhere up to 0.75% in the marginal advantage being sought, depending upon their frequency, whereby the Player's entire count effort will likely be made in vain.

Now, if this all sounds a bit over the top, maybe it is; and then again, maybe it is not . . . . After all, this is a game that now finds a growing number of single deck games paying Naturals at: 6 to 5.

Therefore, a significant "redress" for this old favorite could well prove most timely . . . . To this end, given the demanding yet fickle nature of Housemasters; qualifying a comprehensive redress in the form of a new "top down" rendition for the traditional game of Blackjack will prove tricky. Casino games, especially well established games, evolve ever so slowly due to the rather strident change resistant nature of Housemasters' where their table games are concerned.

Just look at Craps' "stats" for the last Twenty (20) plus years, or Hazard & Faro before that. What eventually dissipates as a game ages is the must have public's participation to maintain steady "drop values" (the Player's cash buy-in) in significant enough numbers as to support a viable Win % value for the game's continued survival.

It is equally true that Housemasters must simultaneously "exercise & balance" their must have Vig-percentage advantage over their Players in wide enough margins while achieving the most viable Win % value possible from the games they run.

In so achieving this result of the most viable Win % value possible, the hourly compellation of hands played is of paramount importance to Housemasters because the hourly decision stream working together with the established Vig-percentage advantage is the cause for all Win % results. As for traditional Blackjack, Forty to Sixty rounds per hour of operation for a full table of Six (6) Players will keep a dealer employed. Therefore, a companion gaming process, such as that of the Applicants', promising a minimum "Ten (10) plus percent increase of hands" (decisions) per hour of operation is quite advantageous from the Housemasters' point of view. This assumes the House's Vig-advantage is being exercised & balanced just right for the publics attraction to play!

Another words, to accomplish this, any new gaming solution entering the casino floor must be very quick to learn and be "fat enough in the math" to allow frequent winners, while nurturing the necessary Win % value required for a productive bottom line Hold % for the casino.

Even though all this in itself is a tall order, a game design that meets these tests by the very basis of its methodology is a real plus, a real big plus!

The simple "rule of thumb" for a new game is; if a game's visual introduction can't first pass the "eye clutter" and, say the "beer test" (i.e., the game looks to intimidating), the public most likely won't play, so therefore the game's chances are very slim.

And of course, if a game's core Vig-advantage is too overbearing, the public won't play either so the game's chances are next to nil!

The Gaming industries foundation formula is: Hold %=Win %, divided by the Drop. In recent years, a large number of "Side-bet" permutations have hit the Blackjack scene. A long view of Blackjack's numbers and performance would well reveal the significant influence of Basic Strategy training aids as published in so many books and table indices, as well as the impact of computer training aids and video games have had over time; thereby inducing the unending search for additional gaming revenues from this Blackjack workhorse.

Clearly, training aids have been a significant driving resource used by the public at large, perhaps a cause for which Housemasters have been induced into making "margin reducing rule changes along with their abiding results over the years."

Wherefore such rule changes, for the sake of a "competitive edge," have starved the very margins of the game. This has resulted in the shaving down of the working House Vig-advantage margins of traditional Blackjack to such an extent as to justify the uptake of so many Side-bet permutations as a means to "re-balance" the then customary Drop, Win & Hold percentages of yesteryear from this perennial Blackjack workhorse. This thinking is also at work as a means to justify this insidious 6 to 5 Blackjack payoff exchange too!

For you see, this Side-bet trend of the last Twenty-five or so years has not only been about satisfying Player boredom, as so many prior-art references state. It has also been about defending the traditional boundaries for which the casino's fixed House percentage advantage in the game had historically operated under in the now distancing past.

That is, a perceived House Vig-advantage approaching +6% that in decades past, due to "margin binding rule changes" and "a gross historical miscalculation as to what 'Blackjack's core margin value really was," has thinned down to about a +2% Vig. for those who have little if any knowledge of Basic Strategy. As applied within the context of advantage play, this accrued margin has been found to be as low as −1.5% to −2% Vigorish impact against the House, favoring the exceptionally well rehearsed card counter or card-counting team.

As such, traditional Blackjack's core operating Vigorish in the final analysis has been steadily pressured, and splintered apart by a progressively wiser, yet still growing Player population during this same almost generational period of time. Most Importantly, a great many of whom are at least proficient in Basic Strategy, which means the casino's Vig-advantage edge ranges from about 0.20 of One (1) % to about 0.65 of One (1) %. Of course, this is notwithstanding; perfected Basic Strategy play that can be very close to a 50/50 play action circumstance, by such Players thereof.

Moving forward, it is a good bet that the shear numbers of new inexperienced Players alone will likely not stave-off continuing pressure upon traditional Blackjack's core margin to somehow produce a better result . . . .

Indeed, as the Applicants know, it takes significant innovation to achieve such ends . . . .

A better result that is!

Why who knows, maybe just around the corner, casinos might move even more defensively to paying off Naturals at say: Even Money, and without further Player recourses, thereby further bolstering their margins as a simplistic answer for achieving the greater revenue streams so needed from the games they offer. Incidentally, such an action would most certainly perform a coup de grace, even against the hardiest of Advantage Players . . . . No matter how many hands per hour they receive.

From a historical perspective, this is not such a stretch. Clearly, certain prior-art "Blackjack permutation games" that are all about not losing . . . already do pay Blackjack hands at: Even Money. And, in further aggravation to this, a great many casinos have already moved to paying off their traditional "Pitch game Blackjacks" at: 6 to 5.

So, what then is going to be the appeal for playing Blackjack moving forward?

Finally, there is yet one more set of hurdles to consider for a successful venture into the gaming business; the "fat enough in the math" hurdle, as previously alluded too. Moreover, this hurdle is the major intersection of several key issues that are given particular scrutiny and held foremost in the minds of Housemasters as they directly pertain to a new game's working House percentage-advantage edge, or Vig.

The commensurate action to this fat enough in the math hurdle is a hurdle conceptually known as "Time-In-Play," or TIP. In the casino business, the House's intentions are to part their customers from as much of their cash as possible, but not so fast as to leave them feeling fleeced or ripped-off. A consequence of which is so common to traditional Blackjack play . . . .

Actually, Housemasters love winners because that is how they earn their money.

"Paying winners" . . . . That's how Housemasters "earn on the churn" of play action!

The House always pays off winning wagers a "fraction short of a true odds payoff"

Hence you might say, even though a game's House advantage must necessarily favor the casino, the more sublime yet steady acting the House's Vigorish (as made inviolable to count methods and other Advanced Player tactics), the better the opportunity for continuing the public's patronage, whereby the game can ultimately become a valuable asset for Housemasters.

Of course, a gambler's TIP is notwithstanding "his own ability" to do something really stupid . . . .

SUMMARY OF THE INVENTION

As will become quite clear, the Applicants are proffering an embodiment for playing "21".

However unlike classic Blackjack/21, the Applicants' modified process for play action engages a No Dealer Hand, NDH approach. Players draw through a flow of cards from either real or simulated deck(s) or shoe(s) of cards until a decision to stand or busting-out upon the next card occurs. Assuming the Player is not "Busted" or "Sacked" (loses), the Player then stands for a percentage loss on the Trigger, stands on a Push, Wins at least even money, or scores a short-Win, upon such a short-Winning outcome tally for their hand(s). This all assumes the Player has not drawn to stand upon a Losing Number. Moreover, as further broken out below, these are all terms for identifiying a variety of outcomes during play action, for drawing to, and standing upon, various numbers in use; via a thread of numbers, operating from Twelve (12) to Twenty-One (21), in toto. Specifically, this "Twelve to Twenty-One thread of numbers," is designed to provide a differential thread mix of outcomes in play, thereby "replacing the Dealer's hand" during play. As such, within the NDH construct of play, these actions are known as "triggering means solutions." In any case, when standing-pat upon a "triggering means number tally" including that of standing-pat upon a Winning Number tally, Players are also then exposed to a mathematically formulated and pre-determined scale for loss or payoff. Furthermore for the sake of clarity, the terms and depictions being used, as illustrated within the exemplary counsels below, comprise the following:

First, a triggering means; used as a Primary and/or Secondary level play action Trigger Number (a.k.a., TNs). These numbers are any single and/or group/set of numbers spanning from Twelve up to Twenty. Another words, any and/or all can be assigned to function as TNs; the benefits of which allows the Player to "keep a portion, usually half, of his entire wager(s) at risk." And second, optional Primary and/or Secondary level play action Push Numbers (a.k.a., PNs) are also assigned play action as any single and/or group/set of numbers spanning from Twelve up to Twenty, as well; while Thirdly, Winning Numbers (a.k.a., WNs) and the new type of short-Winning Numbers (a.k.a. sWNs) which typically allows the Player to "win half of their established contract wager", are depicted and assigned to be any single and/or group/set of Primary and/or Secondary level of numbers spanning from Twelve to Twenty-One. And then finally, there are the "Losing Numbers" (a.k.a. LN's) that may also be indiscriminately intertwined inbetween the; TN's, PN's, sWN's & WN's all of which are more broadly designated and applied, as the "triggering event means" for driving this NDH differential consortium of number agents, to coalesce in its effects.

Additionally affecting the Players of this No Dealer Hand methodology is the impact of the new differing types of decks, and/or shoe configurations, being applied during the game's play. As such, the Standardized Fifty-two (52) card decks for play supports a "House-Advantage" edge or HA, of: "X" value percentage in the game, while the card configuration of say a Carnival deck configuration having Fifty (50) cards in play would represent a: "Y" House Vig-advantage value. Further still, a Spanish configured deck with Forty-eight (48) cards in play offers even yet, a more generous Vig affect of "Z" percentage HA value, as all presently given examples.

A further definition of Carnival and/or Spanish decks being used in play for the Applicants' No Dealer Hand approach defines Carnival decks as having either; their "Red or Black" Ten (10) Pip-cards removed, with the two Joker-cards being put in as replacements, whereby having a wide degree of valuation (i.e. wild-card applications) an purpose (i.e. application to the game and/or special marketing tools for the sponsoring casino) for such Jokers, being applied.

Similarly, Housemasters might simply elect to remove the red or black Ten (10) Pip-cards alone, without Joker replacements. Likewise, the "Spanish-type" decks by definition have all Ten (10) Pip-cards removed from play action, with the uses of Joker cards being strictly a new option.

Furthermore, like traditional Blackjack, Players of the No Dealer Hand methodology will also play out; hand Splitting, Doubling Down & Split-Double Down opportunities as Primary & Secondary Base actions for play, just as would be customary within the play action of the traditional game of Blackjack. However, unlike the traditional game, the Applicants' process for play action establishes a simultaneously accessible "parallel play action dynamic" of additional options being more broadly designated as the "Secondary Decisions' means class and menu of 'volatile' wagers."

The Secondary Decisions class of wager represents a "fork in the road" of play, so to speak; choices the Players have the option to make. These very means offer Players an "intensive menu of variable risk" for sourcing new Secondary wagering event activities across the Applicants' game. As such, the implementation of the Secondary Decision choices of either the Secondary Base or the Secondary Propositions menu of wagers, now also includes the newly arrived at, Power Parlay Blackjack™ & Power Parlay 20,™ or two types of Card Drawing Marches™—CDM's, JCDM's, and Joker's Jackpot™ events, all of which represents this new panoply of proprietary menu choices for decision. As for the Propositions' Box, any of these hands being redirected or moving there will play-out in a similar manner as the Secondary Base Split-hand, Double Down & Split-Double Down hands do for play action, although for a much greater risk/reward play action payoff result!

Additionally, the Applicants' Secondary Decisions class of wagers bear one more distinctive characteristic in that any Player after seeing their first Two (2) cards for Split-hand or Third-card drawing opportunities are able to book a Match play; if not at least, a Base Double Down play. However, within the Prop-Box, Players can also opt for any Match or Multi-Down action from such Proposition play too, which is why the Applicants in context moving forward, will identify the Secondary class of Propositions as; the "on menu choice" for Multi-Down wagers and their events.

Regarding another front, the Players of the NDH/21 style gaming process, as transitioned into for play through programmed electronic formats, especially those gaming apparatuses conveying a wireless projection thereof, a community based, and/or of a singularly intimate nature or otherwise means for play action, will find motivated Players, that might well choose to play-out each "Split-hand decision segment" of a Split-handed event for example, upon a play action strategy wherein One (1) of each of the Split-hand(s) is wagered upon a "differing pay table menu of elevated risk" and all within the same round of play!

Similarly, as will be taught and latter claimed, there exists a great many possible play action embodiments for culminating the Applicants' gaming modifications that are applicable, especially as applied to electronic gaming apparatuses, yet only a few of these embodiments will be cited for development as more exemplary counsels serving as the necessary disclosure hereto.

Therefore in reprise, traditional Blackjack is the most quintessential table game encompassing the psyche of the world's casino going experience. This is true even if you don't play the game. Indeed, from the Gaming industry's perspective; one only needs to look at "Video Poker's" success over the years to see why the Applicants have so targeted their focus, and resolve, upon their game's deployment; via the dynamics of the numerous video processed platforms that are so readily available for an "applications" download and deployment.

As for the Gaming industry's behavior over this last quarter century or so, as new innovations for this perennial favorite "Blackjack" have arrived on the scene, it is astonishing to the Applicants that so few of the art's previously taught methodologies modifying classic Blackjack's play have seen to aggressively redress the compounding historical affects of this fast changing industry upon the Blackjack workhorse at large, as the Applicants will continue to demonstrate, herein. So instead, the public is offered 6 to 5 payoffs for not only single deck Blackjack games, but from multi-deck shoe games too, and yet no alternative recourse for the Player's action is offered. Save for a few mentionable Side-bets.

At least, this is how the circumstances are viewed by the Applicants and particularly, as one might strategically "tune up" this game for the purposes of recalibrating, and realigning, this game from its core mathematical vantage point given the ever growing and smarter Player populations that today, so tends to exploit the thinned down margin circumstances historically playing out upon the classic game's core mathematical dynamic, as all previously developed and cited.

Of course, these historical and contemporary observations are notwithstanding the competitive, yet concertedly empirical "rule change" decisions of Housemasters both good and bad alike from impacting the bottom lines of their own Blackjack games during this same generation, or so period of time as again aforementioned.

So from the Applicants' perspective, there is an alternative to the present day thin-in-the-math "adversarial" circumstance for which traditional Blackjack has historically operated. Therefore by way of such a redress, the Applicants' methodologies of "stripping out the dealer hand effect" to engage their triggering means solution in its place, along with the uses of Standardized or Carnival/Spanish type decks, clears the way for charting a new recourse for Blackjack/21 style play action (i.e., making new rules) as well as establishing a new core mathematical dynamic (i.e., setting new payoffs and HA values) that are competently capable of moving in along side the traditional Blackjack franchise as a most viable companion gaming option!

And as such, their alternative processes therefore result in a more mathematically malleable House Vig-advantage working amidst its play. In that the Applicants' balanced modifications deploy a never before applied synergy of "ameliorating consequences" by way of a wider "core margin variance" for casino's to work with. All of which is made possible through the abrogation of all the historically narrowing and binding effects of the adversarial mathematics that so systemically "chokes off" the traditional Blackjack methodology's ability to cultivate a more malleable working core margin advantage along with subsequently better bets & payoffs for the Player's consumption.

Similarly, the Applicants' methodology of replacing the dealer's hand in play, with their powerful "triggering means solutions" operating within the play action of their game, so fundamentally broadens the mathematical margin being applied by way of the Applicants' modifications; that a richer statistical pool is the first ameliorating improvement from their process.

And this result, already occurs from the Standardized Fifty-two (52) card decks being put to play, not to mention the introduction and use of either Carnival or Spanish decks being applied, whereby allowing for "fatter" payoff ratios, benefiting patrons without casting strenuous financial effects upon the House or worse yet, chasing off patrons with too strong of a core Vig-advantage.

For example, the Applicants' No Dealer Hand gaming methodology establishes a core Vig-advantage of about 2% at its Base play action over its Players, while simultaneously establishing said "richer statistical pool" (from the core margin) for paying much fatter payoffs to winning hands. As such, this roughly 2% House Vig-advantage over Players from the Standardized Fifty-two card deck is more than three times that of the assumed average Basic Strategy Player's results of frequently less than 0.49%, a circumstance for which most casinos will find advantageous.

Rule for rule, card for card, and to the payoffs, the Applicants' methods reveal a profound mathematical shift being integrated from the core of their game, thereby benefiting everyone!

Most importantly, the Applicants' modifications of removing the adversarial mathematics in support of having no "dealer's hand" and supplanting said dealer's hand with their triggering means solution, is by "de facto" the very inducement for the core statistical shift even being made possible. Likewise, this broader margin is made possible while simultaneously applying a seamlessly familiar playing experience for patrons regardless of the particular deck configuration being used.

In addition to this, the House is advantaged by way of the dissimulation of the "collective mind" that is so commonly used by Advantage-Players organizing against the Dealer's hand within the table gaming environment they occupy.

Meaning, in all to many Blackjack games these days, at least one of the six or so Players is frequently a strong Basic Strategy even an Advantage Player whose purpose is to use "polite banter" directly relating to the ongoing game to guide "any & all weaker Players" as to the "what, when & how" of making the correct advantage plays, thereby creating a better than otherwise collective outcome, frequently by pitching Bust cards to the dealer. The ongoing result of this is a functioning House Vig-advantage aggregating much closer to 0.49%, rather than to the more robust productive end of the spectrum at about Two (2) plus percent, before mishaps & mistakes are accounted for, respectively. As applied to the Applicants' play action methodology, banter of any kind has no real measurable affect in orchestrating anything for the obvious reason that there is no dealer's hand to affect, or play-off-of.

Therefore, if the House Vig-advantage is 1.78% or say, 1.31%, 0.96%, etc. or some portion of a flat 5% fee for that matter (before Player mistakes are calculated), then simply put, that's what it is for everyone who plays! Also, from the Player's standpoint, the Applicants' modifications remain simple requiring only routine knowledge and therefore mental engagement on the part of patrons to play and enjoy the game.

Likewise, patrons no longer face down the repeating Upcard Ten or Ace, the Double Bust effect or even the dreaded "Push" on what should have been a winning hand like Twenty, or worse yet, Twenty-one! Furthermore, for the first time in known history, Housemasters can pay a "Blackjack" at 2 to 1, and a multi-card 21 at 3 to 2, at the Base play action of the same game, if they wish, without going broke . . . . This is what the Applicants mean by "fatter payoffs."

A Fifty percent improvement over the traditional game's historical payoffs for a Blackjack or multi-card 21 while in addition to this, Players are usually guaranteed at least even money payoffs on all "Pat" outcome tallies of "Twenty" (20) projecting from the Primary Base and/or Secondary play action decisions of the Applicants' gaming process when used as a Winning Number!

As for Nineteen (19), when used as a "Push Number," the House has a built-in a safe spot for Players assuming the House uses Nineteen (19) as at least a PN, if not a Winning Number, or as a "short-Win" Number (i.e. sWN), whereby the Player wins half of the contract wager's total for the hand, rather than using Nineteen as simply a Trigger Number, which Housemasters certainly can do. As such, this significantly more malleable core margin Vig-advantage working within and from the Applicants' "Initial and/or Base" action for play is a direct consequence of the Applicants fundamental insertion of their Primary triggering means solution into the process; that so productively ameliorates a Player's Time-In-Play too!

Another aspect of the Applicants' methodology is the ability of Housemasters to "use and manipulate" the Primary & Secondary Base triggering means feature as required; meaning there are many pay tables from which to choose covering many wagers on the menu, whereby further massaging the Applicants' gaming process for their casino's financial benefit.

This is an achievement the traditional adversarial dealer's hand game of Blackjack with all of its underlying mathematics could never hope to orchestrate . . . . Additionally, play actions like Surrender can also be accommodated for, albeit, its application works a little differently than traditional Blackjack Surrender does. This will be discussed further below.

Therefore, as will be shown, several of the Applicants many possible Secondary Decision's class of play action pay tables, being made operable from the games core mathematical function are of a progressively intriguing persuasion of elevated risk, as is especially demonstrated, regarding all of the new Player menu recourses being further disclosed in detail below as well.

Clearly, the Applicants new Player recourses like those provided through the tag-along designed Ante-up Joker's Jackpot™ which will be frequently wagered simultaneously as the Player books for one of the new; "Card Drawing March™, or CDM" and/or the "Joker's CDM or JCDM." Also, there are the fantastic "Parlay re-play hands," now available in the mix of new Player options. All of which, are directly compatible with the Applicants earlier formulations & disclosures.

OBJECTIVES AND ADVANTAGES

Accordingly, several objectives and advantages are clearly achieved by way of the Applicants' method of having No Dealer Hand being applied throughout their process of play. First, regarding the "Table Game" process of play; the Applicants' methodology calls for the complete abrogation and replacement of the dealer's hand in play.

The Applicants accomplish this through means of their Primary and/or Secondary Base consortium of triggering number agents working in its effect, again defined as singular, grouped or sets of numbers, typically but not always numerically preceding the Push and/or Winning Numbers as applied in the Applicants' process for play. Again, the triggering agents being applied, will range anywhere from: Twelve (12) up to Twenty-One (21), and can substantially "fluctuate" in their financial impact upon the Players starting at the Primary Base action of the game for a couple of reasons.

One reason is due to the way the completed hands fallout from the shuffling mix of the deck or shoe, while another reason is more attributable to all Primary & Secondary Base and/or Secondary Propositions' Box play action triggering agents in uses that may bear fluctuating "Vig" values as well. This fluctuating Vigorish does play a "freer roll" within the electronic transmission methods for play action as will be further developed below.

Furthermore, this fluctuating Vigorish is notwithstanding a decision by Housemasters to engage a flat fee percentage commission solution being "grafted" in as either an addition to the core margin mathematics already at work, or as an application to both winning Primary and/or Secondary Base play action outcomes or again, just as applied to the winning Secondary Propositions' class of outcomes.

Similarly, decisions to engage only a commissionable percentage due fee solution for either an individual Primary or Secondary Base WN and/or sWN selections, or as applied, to a range of Proposition WNs and/or sWNs shall be further reviewed below as well.

As for the immediate fluctuating impact upon the Players when Standing Pat on hand counts of Twelve up to Twenty-One. Only the practical uses of monetary units (i.e., Chips), as applied to "live action" table gaming applications, along with the same widely accepted mathematical mechanics as to be applied to such live action play with such monetary units, as well as the commonly accepted mathematical mechanics for electronic gaming platforms shall be the guiding factors in determining the House Vig-advantage edge of TN selections as they are applied from: Twelve (12) up to Twenty (20) and/or optional PN selections from: Twelve (12) up to Twenty (20), and typical WN or sWN selections of up to Twenty-One (21) being put to use.

In addition to this, and as expected, Housemasters shall be the arbiters regarding the use and deployment of their casino's deck configurations in play. As planned for, through the uses of either Standard decks, Carnival and/or Spanish decks, etc., the Applicants' NDH methodologies apply the application of Standard Fifty-two card decks, with or without Joker cards being used, and further envisions Carnival decks as having either, the "Red or Black" Ten (10) Pip-cards being removed, with the possibility of the two (2) Joker cards being put in as replacement, whereby exacting a wide degree of valuation and purpose from such Jokers being applied in play.

Similarly, Housemasters might simply elect to remove the red or black Ten (10) Pip-cards alone, without engaging Joker replacements, whereas the Spanish-type decks, have ALL Ten (10) Pip-cards removed with Joker cards optionally being distributed into their place.

Moreover, as in any game, deck configurations bare considerable influence in the core margin analysis of a game's overall House-Advantage-edge. As this is true for the game of Blackjack at large, and will also be the case, for the Applicants' NDH/21, methodology.

Additionally, Housemasters through both "live action" table gaming methods including organized tournaments as well as through electronically mechanized gaming equipment, inclusive to "third party" hand held wireless devices too, might well adopt a commissionable percentage due fee and/or point structure for a win/payment/prize application to winning wagers or point totals being accessed for payout/award from particularly, but not limited to, the Applicants' Secondary Decisions Fork and menu of applications.

Clearly, as one can see, several differing yet cohesive aspects of the Applicants' process for play can arise among this range of deck configurations, and the TNs, PNs, WNs & sWNs, being applied for play action from: Twelve (12) to Twenty-One (21), respectively.

For example, if a given casino was to counsel the use of Seventeen (17), as their first Primary Base selection of a triggering event being used, this would leave Standing Pat on every hand count "short" of Seventeen (17) as being "Sacked". Meaning, the Player loses their entire wager while each and every Player hand count tally finishing over Twenty-One (21) are Busted, therein losing their entire wager(s) as well. Why? Because, it's the "first triggering event of the Twelve (12) to Twenty (20) differential thread mix being utilized, as the 'activating agent or triggering agent' being engaged in replacement of the now absent dealer's hand during play action."

In even another example, if Housemasters counsel the Primary and/or Secondary Base triggering events to be: TN's 16 thru 18, with 19 as a Primary and/or Secondary Base action Push Number and 20 & 21 as the Winning Numbers, then all Player hands Standing Pat on Fifteen (15) or less, would be Sacked for a complete loss as well, and so on.

As a practical matter, this situation of getting "Sacked" will only occur when a Player succumbs to Standing Pat with a "hand count 'short of the first' established Primary and/or Secondary Base play action triggering event" or the Secondary Proposition's triggering event being used, as with a "short hand count tally" from a weak Double Down and/or Multi-Down action, or a weak draw on Split Aces or Parlay hands, should Players only be allowed One (1) card for each Split Ace or for each card of a Parlay hand.

Again by definition, a Sacked hand count within the realm of the Applicants' process for play is any hand count that is not Standing Pat upon at least the first triggering event among the selected triggering event(s) being applied to the game, whatever they might be, Primary and/or Secondary Base triggering events or Secondary triggering events within the Propositions' Box.

Therefore, beginning with the dealing of the cards, all Players are dealt Two (2) cards. Then starting with the person sitting at first base on the table, each Player seeing the value of their present two-card hole-count hand tally have fast decisions to make; do they "Surrender," "Draw" card(s), "Stand Pat," "Double Down" and/or "Split" their cards, including Splitting their cards for Double Down play action(s), all of which begin as Primary & Secondary Base play actions. Or, as perceived makeable, do Players assume the greater risk of the Secondary "Propositions' Box" be they for Split-Hand, Multi-Down or even Multi-Down plays on a Split multiple of hand(s), including the application of the new Parlay Blackjack & Parlay 20 hands. In regards to the means of executing such Parlaying re-play events, these wagers are "Post-paid" Parlay action events meaning; once the first winning Blackjack or eligeable two-card Twenty (20) shows in play, and subsequently is paid-off, the Player is then "prompted" into this new means of play.

Such play is; the Parlaying-Split and replay of the original two-cards involved for either type of hand.

In so doing, the Player is then able to access and increase each new hand up to; Triple their original bet, and draw at least One (1) new card for each new hand in play. Indeed, pay-offs are guided by the more aggressive Propositions' play action regimes, as being called-out upon either the tabletop or "prompted at the point-of-touch," somewhere upon the video screen's interface.

Each new hand stands to win, lose or tie, according to the paytables being applied.

Also, remembering, the Secondary Decisions regimes are ALL ABOUT the "Secondary Base play action vs. the more aggressive Proposition Box's regiment(s) of Secondary play actions." Therefore, Players can and will, utilize both paths of the Secondary Decisions' means when redirecting all of their differing Ten (10) & Eleven (11) count hands, or Splitting and Multiplying Down on paired Aces for example, or even particularly, as applied for the Parlayable hands of the Ace-Ten/POWER PARLAY BLACKJACK™, and the Ten-Ten/POWER PARLAY 20™ hands.

In actual play action, any Secondary Decisions class of wager moving up into the "Propositions' Box" wagering area, is readily identifiable upon any "No Dealer Hand" game table layout whether increasing an initial wager(s) or booking a new wager, while exposing said wager's completed hand; to a significantly greater risk & reward event from what they would otherwise experience within the "Base play action" of the game alone!

So, in a nutshell, the whole idea and application of the Secondary Decisions regimes with its expanded content for Player recourses, of which its effectiveness in ameliorating the Player's time-in-play (TIP), is all due, to any given arrangement of the Applicants' proprietary triggering means solutions, 'as already discussed, and applied; drives their NDH methodology via the differential consortium of number agents working in its effect. Certainly, the Applicants' Secondary Decisions regimes also induce Players to reach for the casino's "Chandelier" as it were, when engaging their differing Ten (10) & Eleven (11) count hands for multi-down plays, parlaying Blackjack & hole-count 20 hands, or too execute one of the new two-card, and/or Split-hand into single-card-hand CDM actions, along with it's additional "progressive Joker's Jackpot™" opportunities.

Subsequently, the Applicants' Secondary Decisions process also allows for each Player, to now routinely resolve to reconsider, and re-engage the status of their "initial Base contract" wager(s). Naturally, these decisions occur just as a move to the Propositions-Box commences; meaning after booking their first contract wager and viewing their first two (2), hole-count cards. Therefore, should a Player desire to increase their wager(s), now another new class of wagers having its own protocols is also coming onto the scene. As just aformentioned, the exciting new means for executing a Single-handed or Split-handed play including the Splitting of offset cards for the same, is now in view. This new and very specialized class of wagers are identified as Card Drawing Marches™, CDM's & Joker Card Drawing Marches™, JCDM's, respectively.

Further compelling this process, is a specialized means for action being made available through the distribution & redemption of Joker cards via either, Standard, Carnival or Spanish types of modified decks or shoes being used, and will prove a useful "enabling factor" driving attentive Player participation. However, CDM's are an aggressive class of wagers, which will acquire there popularity via the more Advantage Player's attention to this wager at least, as it is first introduced. So then, the Applicants have decided to offer the JCDM too, that is quite capable of amelorating any market resistance to this new class of alternative Single and/or Split-handed wagers.

And now, as just introduced, the two new types of Splitable in everyway CARD MARCHES,™ having their own paytables being used in play, along with an "Ante-up Jackpot" being added into this mix of menu options all assumes the Player is willing to withstand the elevated risk of getting Sacked or Busting as the circumstance may play out.

However, "House restrictions" particularly upon all Aces, and two-card Eleven (11) hands for CDM actions can be applicable. As such, all Aces involved with any type of CDM will bare a value of One (1) . . . . And, all Two (2) card Eleven (11) count hands may require a Split into Two (2) CDM hands for play action, in this example. Other restrictions may apply.

Therefore, the totality of the Applicants' unique methodology model(s) provide a "whole new outlook" directly supporting most all of the aforementioned features & benefits from their game's core-math mechanics. By way of such design, Housemasters can modestly increase or decrease the game's critical core operating margins in addition to the margin-costs of applied rules & payoffs in play; starting with the affective choice of deck configuration, and this all before the first card is ever disclosed in play.

In addition to all the above citation, below are just a few clarifying examples regarding the use of differing deck configurations, when engaging Joker cards, while all other details are in "example" form too, and applicable for either programmable electronic, or physical table game solutions. Typically, the broadest range of allotments for Joker cards will be "up to" Two (2) Joker cards being applied in play, per deck in use, or say within an Eight (8) deck shoe this would allocate "up to" Sixteen (16) Joker cards for use in play, etc. After there first use for JCDM's, Joker-cards will be tied to hole-count "joker/Ace" instant bonus outcomes, or as a "paired Ante wager Side-bet."

First, The methods for Joker card acquisition can come to the Player either by way of the Player's first Two (2) hole cards at the start of a new hand or from the random draw of cards during the course of playing said hand. In all cases for this scenario, the Joker cards are immediately replaced with the very next card or cards, off the deck or shoe. Now, such Joker cards for table game play are "held for/by the Player" to then be redeemed in a future hand of the Player's choosing, during the play of each deck or shoe.

And second, the redemption of Joker cards become one more tool and means for inducing Player participation into an arena of the game by allocating an optional increase to said future hand's initial contract wager having been put into play, thereby delivering a much richer core-margin advantage for the House. Through such a redemption cycle for said Joker cards; a Joker's CARD DRAWING MARCH,™ JCDM, is then ensued through one of the Prop-Box's menu of paytables being assigned.

The mechanics for such Joker card redemption in practice, begins by the Player establishing a new wager in the Base play action of the game. This is followed by the Player acquiring a new two-card hole-count hand. Next, if the Player decides to act, "they advance (slip) a 'presently held Joker card to be redeemed face-up' under the existing contract wager," whereby then, likely being moved up into the Prop-Box wagering area for play through either a fixed play action menu or a selected video menu, according to the Player's desire and appetite for risk! It is now, the Player is allowed to increase the contract wager on the table. Table rules dictate allowable increases . . . .

In play action, the two hole-count cards already dealt for the hand may begin a Player's Joker CDM . . . win, lose or push. Should the Player have more than one free-uses Joker-card, and should a new two-card hole-count hand be a pair (i.e., A-A thru 10-10) or some other "offset pair" of any kind, including Stiff hand-counts (i.e., 12 thru 16), these are many of the opportunities to consider any of the CDM actions in their cycles. Therefore, "Splitting" can be a useful strategy. As for hand Splitting, only single card values of: may initiate a Split-hand's play; again, with Aces for this class of CDM wager always having a count value of only: ONE.

Therefore, holding a Joker-card along with the hole-count card(s) already being established for the hand, having been "Split" or not, begins at least one (1) Joker's CDM cycle . . . win, lose or push. Moreover if, another new Joker-card shows upon the draw of this hand while engaging such a redemptive action with a cumulative hand count that has yet to Bust, this results in an "instant winning draw" of at least an Even Money payoff to the Player.

It simply does not matter how many cards are drawn before a repeating Joker shows, as long as the hand does not "Bust over 21," first . . . . There will be times when playing little cards into CDM actions will prove advantageous, there will also be times, that only "Aces" should play! So again, regardless of the number of cards being drawn, or whether a JCDM starts with one or two cards per hand, if the next card out of the shoe, is a new Joker-to-show, the hand is over and the Player wins!

Regardless of how the Player wins either type of CDM, by drawing to a sWN, WN or a new Joker shows in the draw, the choice of wagering either a CDM or JCDM play is CRITICAL regarding the overall ancillary play action conclusions; including the uses of any TN's, PN's, sWN's and WN's being applied along the way in acquiring that "BIG 21" outcome being sought!

However, a more aggressive CDM for example, could easily look something like this . . . .

Say, a Player draws an initial hole-count hand beginning with a pair-of-threes, or say an off-set hand of a 6 & 3, and since the Player has decided to make two CDM plays, and this Player has "no Jokers working" for either hand, therefore he begins his CARD MARCH™ from one of the first Split/3's," or Split-Six & Three hand(s), or again from a single combined hand of Six (6) or Nine (9).

Next, the Player begins to draw cards . . . . And, most importantly, the first opportunity to stop drawing cards comes arbitrarily, on say Sixteen (16), then again on Eighteen (18), where these two outcomes are playing as PN's for this action, thereby leaving "Twenty-One" as the single WN target too draw to; winning say 5 to 1, in payoff . . . . All other possible outcomes are undesignated Losing Numbers being applied within this particular pay-table's Twelve (12) through Twenty (20) differential thread mix of number agents in play. This is an aggressively exciting play, and if, the Player also Tripled Down on both CDM events before starting out, paid they're possibly required CDM "entry Antes fees" upon both hands, along with the Two (2) "Ante-up" wager(s) needed for a "double attempt grab" at the Joker's Jackpot™ as well, then a very BIG WIN is possibly at hand.

Another aspect of the CDM is there direct financial support for the Joker's Jackpot™. The Joker's Bonus Jackpot is a companion Side-bet that accumulates into an uncapitated Jackpot via "Antes, Rakes & fees" from CDM activities until it's won, then its process replicates again.

All CDM Jackpot plays, require the Player to pay an Ante-up fee, prior to drawing their cards. This Ante-up fee, can be equal to a "small % portion" of either the Player's initial or total contract wager(s) at risk, or can be a "fixed flat fee" (i.e. $1. to $5. per hand), a Player must pay to participate in feeding the ongoing Jackpot opportunities being associated with their CDM efforts.

Also, as the Player books the more aggressive CDM's or the less aggressive JCDM's, all hands ending with a winning score of: Twenty-One (21), might contribute another Rake % Fee, to the Jackpot from such winning CDM's play action, right off the top, as the Players is paid-off.

In this way, the second infusion means for replenishing the Joker's Bonus Jackpots is made. As such, say up to a 20% Rake, could be extracted from each Player's winning CDM as they occur in live action games, or as they occur via video play action; operating on the casino's LAN or WAN, which represents two differing Jackpot feeds and sources from first the Player's activities, and later benefitting the House, as they draw upon their "Admin % Rake" for all subsequent Jackpot payoffs.

All Ante-up fees are ×2, if the Player is booking "Split" CDM's back-to-back. In applying first Ante-up fees, then Rake fees upon winning CDM hands, two (2) key, yet simple working replenishment methods for continuously rebuilding a Jackpot's post-win cash growth is secured.

To recap, Players can WIN this twin-win event, inclusive to either CDM, along with the Jackpot, if a winning point count of exactly Twenty-One (21) is achieved, and; assuming all required "Ante-up's" were paid prior to the start of the CDM. All "other WN, sWN or Joker-to-show outcomes" will result in a win of some measure, either with or without that win Rake/Percentage Fee being attached yet, only according to their respective paytables and House directed rules.

Furthermore, because of the "implied means of a safety-net" for which Trigger Numbers, Push Numbers, short-Winning Numbers, and the Joker-card redemption process alike, can all participate there is plenty of Player modivation for engaging either/or both types of CDM's. Simply put, Players are routinely compelled to go-for-it, and reach for the huge potential of that march to a "21 & VICTORY!" Again these results stand, regardless of the accumulation of cards being drawn, be that one card or ten cards, as long as the Player stands as a winner, before Busting-out occurs . . . .

In other uses . . . . Should both a Joker and an Ace come together as an initial hole-count hand, this would statistically demand a bonus payoff. This circumstance can be with or without an Ante-up consideration, and completely up to Housemasters. Also, not to be overlooked, should a "Pair of Jokers" show in an initial two-card hole-count hand, wherein such a showing could easily comport into a "first two-card Ante wager," which would pay a very special bonus payoff while leaving said Joker cards from both scenarios to still be redeemed later, before the shoe plays out.

Furthermore as a practical matter, having just outlined the Joker's Bonus Jackpot as the Applicants have done above, it is assumed that the House can at its whim, deploy any number of "other" useful methods for "funding any and all," types of Jackpots.

This clearly means that Housemasters can utilize completely outside methods, such as third party financing agencies thereby funding numerous types of "life changing anomaly-outcome Jackpots" for the attraction of some.

FOR EXAMPLE

Trip Sevens: 7♣ 7♥ 7♦;
Trip Flush Sevens: 7♥ 7♥ 7♥;
Short Draw Straight 21: 6♠ 7♦ 8♣;
Short Draw Straight Flush 21: 6♠ 7♠ 8♠;
Long Draw Straight 21: A♥ 2♣ 3♣ 4♦ 5♦ 6♠;
Or, even the really
Long Draw Straight Flush 21: A♠ 2♠ 3♠ 4♠ 5♠ 6♠.
Which is truly, astronomically rare . . . .

Such anomaly based 21 outcomes could surely be offered with Joker-to-show implications as well . . . .

Actually, Housemasters can and will, create and apply many differing methods and purposes for Joker card deployment(s) as they see fit, with their many corresponding Rules & Payoffs and/or Antes, Rakes & Fees along with the ancillary consequences upon the respective paytables in use.

As such, the Applicants' unique methodology models provide a "whole new outlook" that as presently discussed is; utilizing standardized decks of cards that directly originates, and then projects many of the Applicants' methodology features and benefits from its core mathematical mechanics for play, while still providing for all the necessary elements of a sustainable addition to the classic Blackjack workhorse of which the public will enthusiastically embrace.

Nevertheless, moving back to the center stage of play action now, should a Player's first Two (2) cards tally to a Stiff hand (i.e., a 12, 13, 14, 15 or 16) that is less than the selected set of Primary triggering numbers (i.e., 17-18-19) assigned for the paytable's uses, the Player(s) may also then elect to Surrender and "Stand Off to a Push," meaning the Player does not win or lose as Surrender is defined within the Applicants' process; assuming Surrender is available at all.

However, any established "Ante" wager Side-bets would most likely fall to the House as a consequence of exercising such a Surrender option. Likewise, the Surrender option as applied may well prove subservient to additional factors like; No "back-to-back" Surrender and/or No Surrendering on a "triggering application of numbers," from: Seventeen (17) up to Nineteen (19), and/or No Surrender after a third card is drawn, or even to include, No Surrendering upon "newly progressed" (increased) wager(s), all in example.

In further reprise regarding Secondary Decision regimes, and draw cards; since the Applicants' process for "21 play" is unique, in that if, on the one hand, a Player's first two-hole cards tally to less than the selected Primary or Secondary triggering events (i.e., 17-18), Players are then certainly compelled to draw at least One (1) card under many given situations. This is due to the fact that a Player's hand count lies in a Sacked condition at this point, and therefore the Player will lose their entire wager on any standing tally count of Sixteen (16) or less, for this example.

This again assumes the Player did not exercise their first Two (2) card Surrender option, which may have been available to them, and is notwithstanding the Player drawing to a Sixteen (16) or some other Sack numbers lying in wait to be applied in a Secondary Base Double Down play action or some other Secondary Propositions' Multi-Down action the Players may have made.

Once more, on the other hand, should a Player's first Two (2) cards or any number of cards for that matter tally to; Sixteen (16), Seventeen (17), Eighteen (18) and/or Nineteen (19) which can often represent a typical selection of Primary or Secondary triggering number events being used in execution of the Applicants' game, these Players are then hanging-on-the-trigger.

Surely, when Players are caught "hanging-on-the-trigger," they still might want to draw at least One (1) card due to the fact that "Standing Pat on the trigger" will cause a Player to lose up to a "hefty portion" of their contract wager presently at risk for the hand.

Of course, the risk of Busting, over Twenty-One (21) is confronting the Players in this circumstance too, which instead would result in the complete loss of their wagers.

In further development of the triggering means in application, at least within the Applicants' electronic processes for play, Housemasters might well call for the "expansion or retraction" numerically of the triggering affect, "even on the fly of action," either by including Sixteen (16) or say subtracting Seventeen (17), as just one example. Or for example, arbitrarily loosening and/or tightening, "even on the fly of action," the application of the Houses' fluctuating Vig-advantage percentages for such triggering events projecting from any Primary and/or Secondary selection of triggering events being applied as well as their winning payoff regimes.

Clearly, such play options will likely operate in their greatest dynamic capacity as applied to the Applicants' electronic applications.

In addition, Housemasters might well see a reason to utilize numbers like Eighteen (18) and/or Nineteen (19) as optional Push Numbers, at least within the Primary and/or Secondary Base play action, or as applied to both types of CDM's, instead of just simply using them as Trigger Numbers, in example. The Primary triggering numbers in uses would then be 16, 17 or 18, or maybe just 17 & 18 respectively, along with their "biting triggering values" for the House.

Therefore, in this example, at least 17 & 18 are the Primary TNs while 19 is functioning as a Primary PN thereby leaving 20 & 21 as the WNs. Additionally, and as aforementioned, a reduction in the Secondary selection of triggering number events from 12 up to 20 could also be used for Double Down and/or for the "higher risk" Multi-Down menu of actions or as applied to CDM's.

Likewise, either of the Applicants' aforementioned Primary or Secondary Base and/or Secondary Propositions play action selection of TNs, whatever they are established to be 17 & 18, or 16, 17 & 18, or just simply 19 for that matter respectively are also subject to an "adjustable" and "fluctuating" percentage for affect, as again just delineated. Meaning, each TN is either subject to the same static Vig-advantage affect in its individual/group number setting for play action (as will be commonplace for table gaming action), or Players may realize a rising escalation or fading reduction of Vig-percentages affecting each individual TN in its group setting by random electronic impulse, even as played out upon the fly of play action.

Indeed, such options are particularly relevant to the Applicants' many cumulative electronic applications and wagers.

However, not only within the realm of "static" table play action, say a Primary Base selection of TN's: 16-17-18, all factor as a static 50% loss, or "Vig affect," upon the Players contract wagers when Standing Pat while a Secondary Base and/or Secondary Propositions' group of TNs affecting Base Split-hand Double Downs and/or Proposition Multi-Down actions might well bear a fading reduction or "Vig affect," like: 60% on 16; 50% on 17; 40% on 18, respectively.

Or, for that matter, any number of productive solutions can be made to apply from expanding to retracting triggering events, rising or fading Vig-percentages or just simply using fixed "static" techniques which are all processed within the same or similar core calculation mechanics of the Applicants gaming formulations as made acceptable through widely held mathematical procedures, and as ultimately displayed upon the House's numerous play option events, and there pay-tables.

Therefore, it is directly through the Applicants replacement of the classic Blackjack game's "Dealer hand" method as initiated through the application of their Primary & Secondary Base differential thread mix consortium of triggering number events that opens up such a significantly improved core margin variance for exploitation in the first place, as once again aforementioned.

As such, the Applicants' core solutions provide a "whole new" outlook directly supporting fatter core payoffs starting from their Initial/base mathematical mechanics for play while still providing for all the necessary and creative elements of an interesting and sustainable alternative to the classic Blackjack workhorse for which the public will enthusiastically embrace.

Furthermore, it is the continuing objective of the NDH/21 Props & Jackpots methodology to provide a wholly new gaming process dynamic while requiring only routine mental focus to enjoy a seamlessly familiar playing experience.

It is another continuing objective of the NDH/21 Props & Jackpots methodology to provide a wholly new paradigm of thought provoking play that competently coincides with accepted mathematical mechanics and procedures regarding applied probabilities of chance projecting from the applied integrating core resources of first; the cards, along with their shuffle mix dynamic, and then their play action distribution.

It is still another continuing objective of the NDH/21 Props & Jackpots methodologies to provide for the play action distribution of a number of acceptably configured decks of cards, be they Standardized, Carnival or Spanish decks which may include the usage of Joker cards during their composite revelation to Players, for which application thereof, provides a certain degree of mathematical volatility and value, being built into the basic functions of the game whereby Housemasters can apply many differing types of wagers and methods including for Joker-card deployments and payoff regimes with their corresponding rules and consequences.

It is still another continuing objective of the NDH/21 Props & Jackpots methodologies to provide for the transmission of any number of acceptably configured, electronically simulated decks of playing card values, be they Standardized, Carnival or Spanish decks which may include the usage of Joker cards during their composite revelation to Players, for which application thereof, provides a certain degree of mathematical volatility and value, being built into the basic functions of the game whereby Housemasters can apply many differing types of wagers and methods including for Joker-card deployments and payoff regimes with their corresponding rules and consequences.

It is another continuing objective of the NDH/21 Props & Jackpots methodology to provide a wholly new adaptation in the form of a differential thread mix consortium, of triggering events from Twelve (12) up to Twenty-One (21) for establishing the Base consequence for play that replaces both the action, and function, of the now absent dealer's hand in play.

It is still another continuing objective of the NDH/21 Props & Jackpots methodology to provide for the engagement of a Primary Base set of play action triggering events comprising any numbers from 12 up to 21, that can be expanded or retracted numerically, as well as being loosen or tighten on a percentage basis, even on the fly of play action, whereby regulating the House's operational win/lose cycle to a point of prescribed volatility, therein benefiting the House's core margin Vig-advantage via the Applicants' Base process for play.

It is still another continuing objective for the NDH/21 Props & Jackpots methodology to provide for the use of a Secondary Base set of play action triggering events comprising any numbers from 12 up to 21, that can be expanded or retracted numerically, as well as being loosen or tighten on a percentage basis, even on the fly of play action, whereby regulating the House's operational win/lose cycle to a point of prescribed volatility, therein benefiting the House's subsequent operational "win percentage values" for Split-hand and/or Double Down actions from the Applicants' Secondary Base process-for play.

It is even another continuing objective for the NDH/21 Props & Jackpots methodology to provide for the use of the Secondary Decision's menu of triggering events, also comprising any numbers of the differential triggering thread being applied from 12 up to 21, that can be expanded or retracted numerically, as well as being loosen or tighten on a percentage basis, even on the fly of play action, whereby regulating the House's operational win/lose cycle to a point of prescribed volatility, therein benefiting the House's subsequent operational "win percentage values" for all types of Multi-Down actions from the Applicants' Secondary Propositions process, as put into play.

It is still yet another continuing objective for the NDH/21 Props & Jackpots methodology to provide for the additional proprietary adaptations of Power Parlay™ hands, via the Secondary Propositions' type of Multi-Down play action events; including the Parlaying of Blackjack hands, and the Parlaying of initial hole-count Twenty (20) hands, offering higher payoffs being projected through at least the Integrated core mathematics of the Applicants' card play methodologies.

It is still another continuing objective for the NDH/21 Props & Jackpots methodology to provide for the engagement of the Applicants' Secondary Decisions process that allows Players to reconsider, and increase the amount of their "initial Base contract" wager(s), after viewing their first two hole-cards, whereby if a Player desires to increase such wager(s), this method now allows for such an action before drawing additional cards, therein defining; a specialized Card Drawing March™ (a.k.a., CDM), being applied through the Secondary Decisions' menu and process inclusive too, the useful application of any; TNs, PNs, sWNs, WNs or Joker-cards being applied in play.

It is still yet another continuing objective for the NDH/21 Props & Jackpots methodology to provide for the additional proprietary adaptations of the Applicants' Secondary Decisions process, that allows for the acquisition of an additional "Ante-up" wager as a means for funding a Jackpot component, upon the Player's entry of either type of CDM or JCDM, whereby Players also make themselves eligible for an additional Jackpot payoff upon a winning hand of "21" points.

It is still yet another continuing objective for the NDH/21 Props & Jackpots methodology to provide for the additional proprietary adaptations of the Applicants' Secondary Decisions process, that further includes; an additional means for exacting a small percentage fee from any type of winning CDM to financially assist the funding of this method's companion Jackpot component as now being applied through said Secondary Decisions' menu/fork and applications.

It is still yet another continuing objective for the NDH/21 Props & Jackpots methodology to provide for the additional proprietary adaptations of the Applicants' Secondary Decisions process, that further allows for Housemasters' to typically exact at least an "X" % rake, upon a Jackpot's running total prior to each winning pay-out, as an administrative fee.

It is still yet another continuing objective for the NDH/21 Props & Jackpots methodology to provide for a redefined adaptation for Surrender, as an option of play, that functions in play action as a "stand off" solution alternative for an initially dealt Two (2) card Stiff-hand of less than the first triggering number event being applied in play action.

It is still yet another continuing objective for the NDH/21 Props & Jackpots methodology to provide for an additional assortment of ancillary "Ante" wager type Side-bets for bonus payoffs, upon the outcome of the first Two (2) or Three (3) cards of a hand being dealt from which Players can choose.

It is even another continuing objective for the NDH/21 Props & Jackpots methodology to provide casinos' with a gaming mechanism that can be manipulated to result in a more sublime manner, while ameliorating the affects upon a patron's Time-In-Play.

Another consideration regarding the Applicants continuing objectives for their NDH/21 Propositions & Jackpots methodology, as transitioned into for play via programmed electronic formats, especially those of video display unit apparatuses, conveying a wireless projection thereof, supporting either a community based platform or that of a singularly intimate nature (not shown), for play action, whereby a more complete and sensitive, "even mill-able scale of credits distribution" can be used for either or both of the Primary and/or Secondary Base triggering number selections or Secondary Decisions' menu of triggering number selections being applied, via the application of Trigger Numbers, optional Push Numbers, short-Winning Numbers or Winning Numbers being comprised from Twelve (12) up to Twenty-One (21).

DESCRIPTION OF DRAWINGS

The foregoing features, advantages and other objectives of the Applicants' methodologies and modifications will become even more clearly understood from the following flow of decision chart embodiments for progressive events as taken in conjunction with the accompanying "description of counsels" (rules for optional play) encompassing any physical table game and/or Electronic video or even wireless broadcast gaming display apparatuses being applied for the same.

FIG. 9*a* Illustrates a first exemplary counsel embodiment with there predetermined payoffs.

FIG. 9*b* Illustrates a continuing first exemplary counsel embodiment for play action.

FIG. 10*a* Illustrates a second exemplary counsel embodiment with there predetermined payoffs.

FIG. 10*b* Illustrates a second continuing exemplary counsel embodiment for play action.

FIG. 10*c* Illustrates a second continuing exemplary counsel embodiment for play action.

FIG. 11*a* Illustrates a third exemplary counsel embodiment with their predetermined payoffs.

FIG. 11*b* Illustrates a third continuing exemplary counsel embodiment for play action.

FIG. 11*c* Illustrates a third continuing exemplary counsel embodiment for play action.

DETAILED DESCRIPTION OF EXEMPLARY EMBODIMENTS

Figure 1:
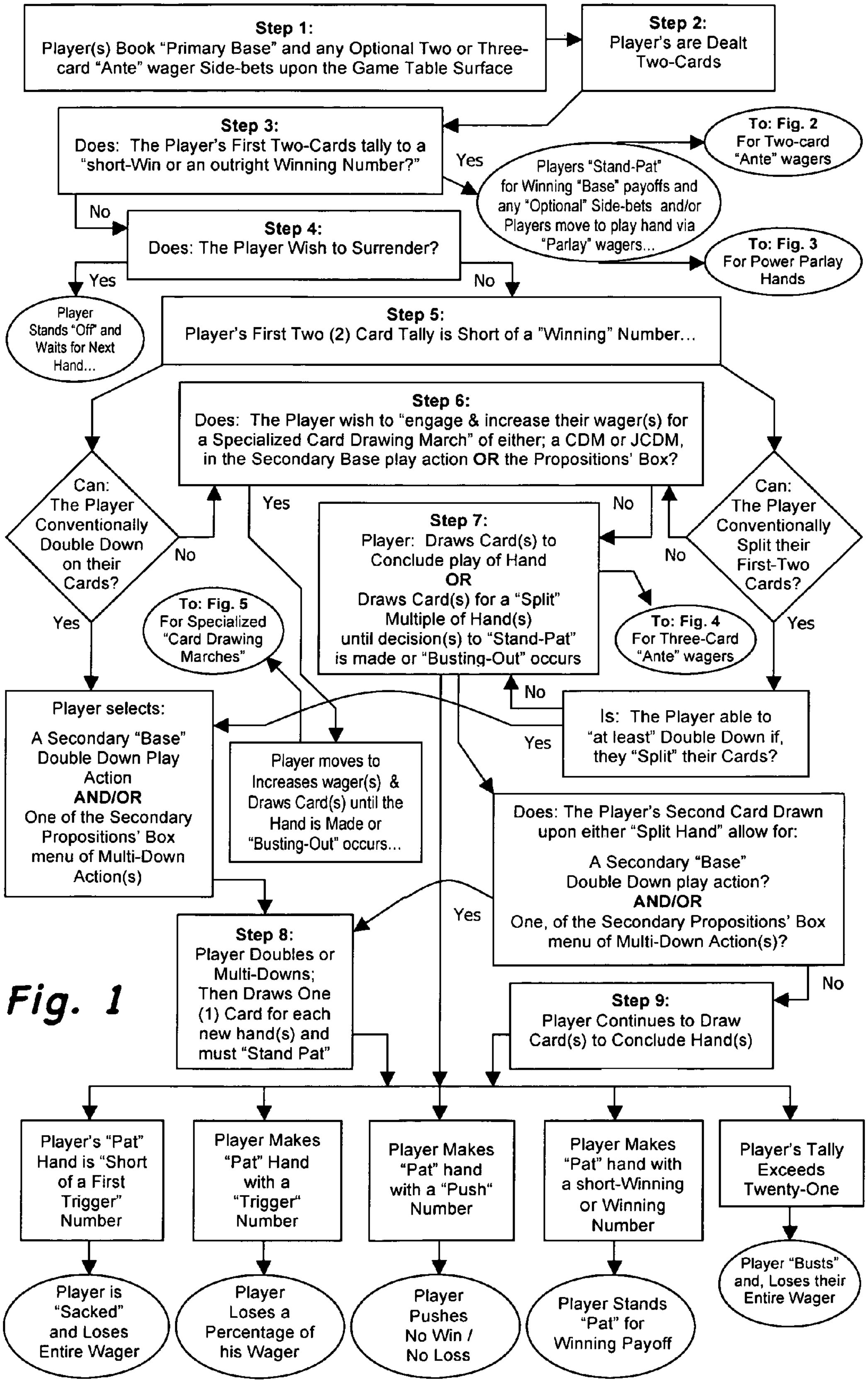
FIG. 1 Illustrates the general flow of progressive decisions/events to complete a round of play for the table game version of NDH/21 with Parlaying Propositions & Jackpots.
Figure 2:
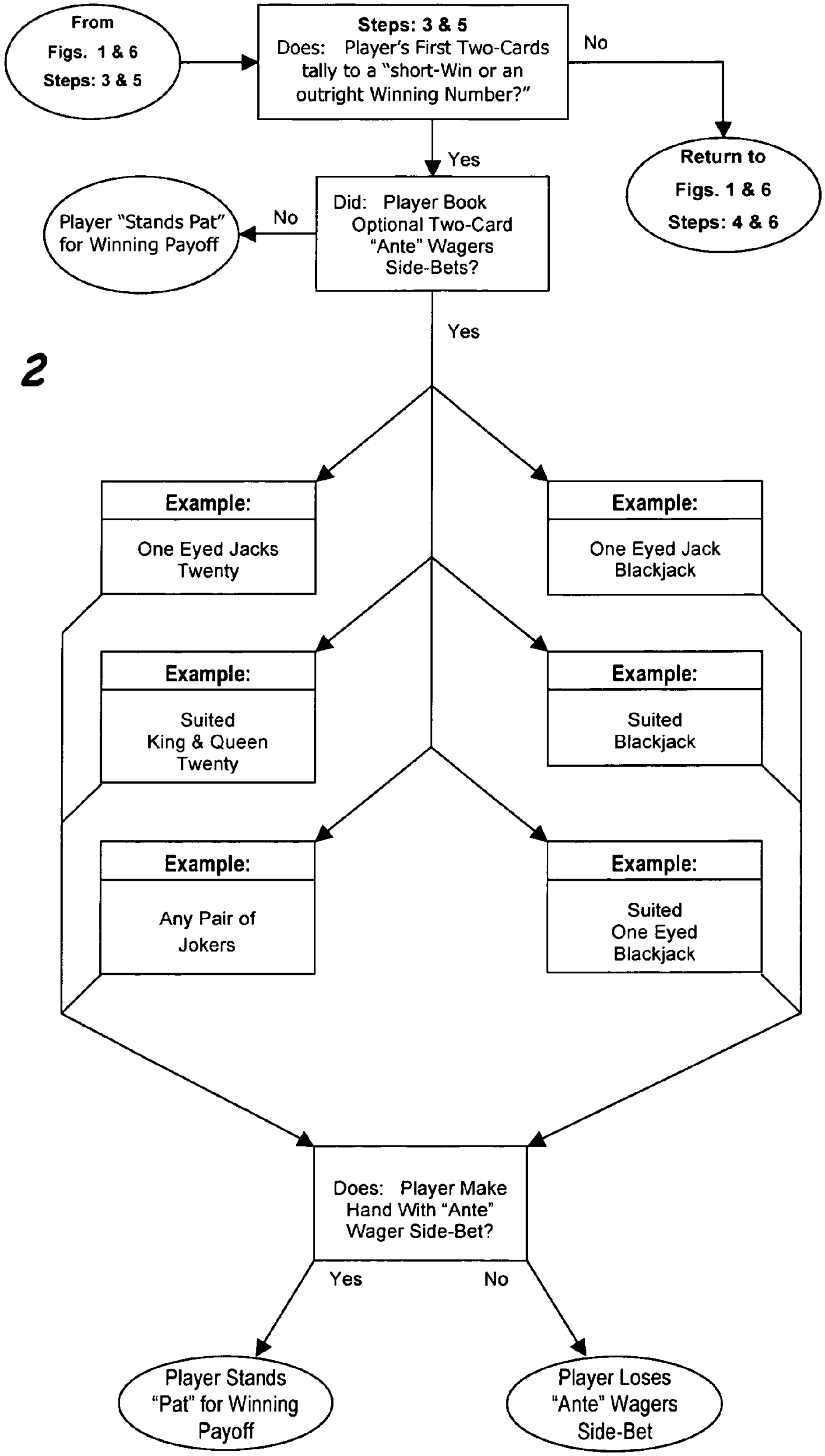
FIG. 2 Illustrates some of the many possible, first-two-card "Ante" type wager Side-bets.
Figure 3:
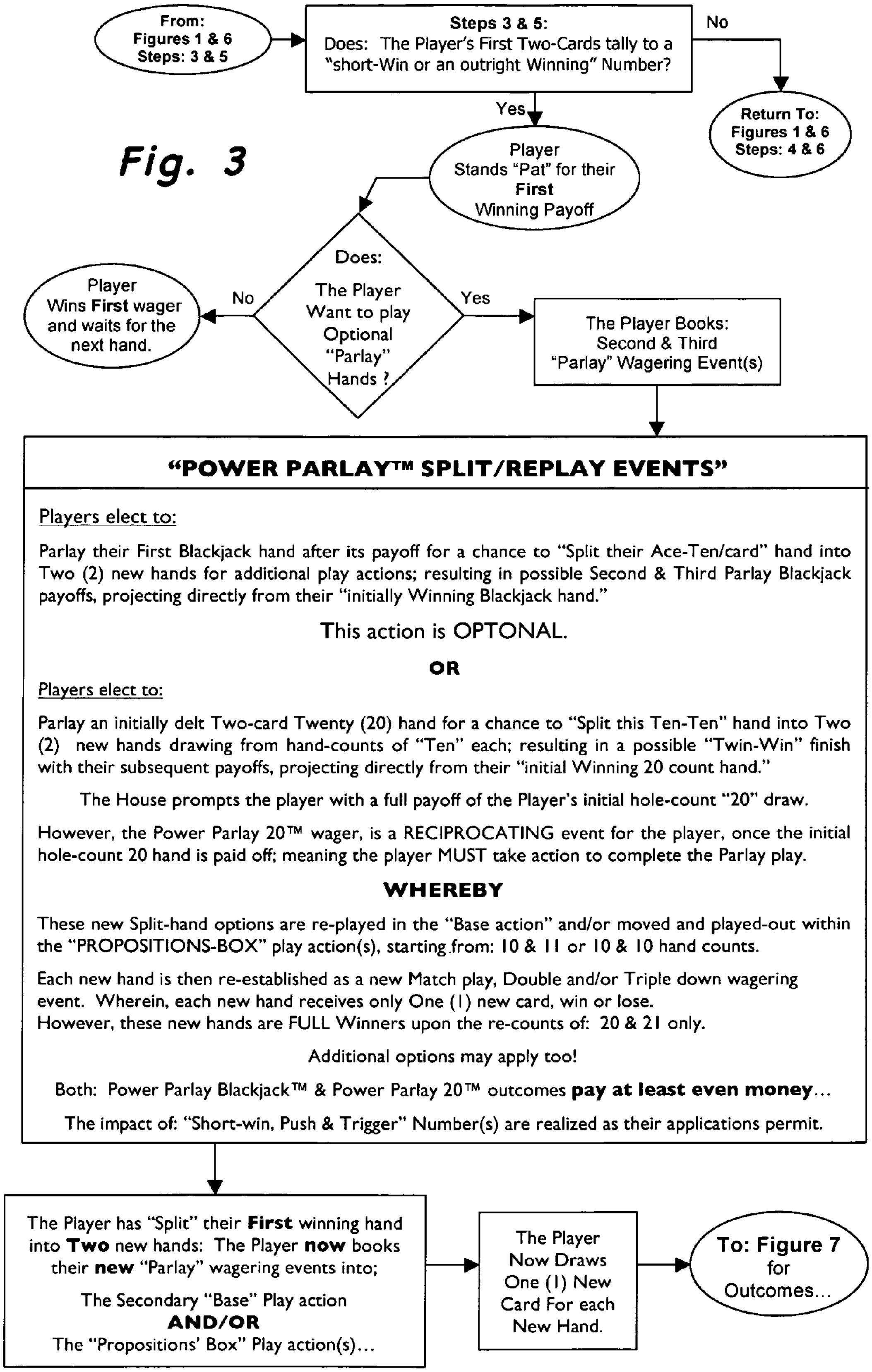
FIG. 3 Illustrates the means and methods for engaging the "Parlay" re-play hands during play.

In referring to the drawings as illustrated, it shall be understood that the combined entities of FIGS. 1 through 11*c* inclusively are exemplary embodiments of the Applicants' gaming methodology. As such, any and all of the triggering means for play action, be they applied Trigger Numbers, Push Numbers, short-Winning Numbers or Winning Numbers as selected, discussed and/or illustrated are subject to change at the whim and purpose of the sponsoring organization.

This pertains to their numerical associations to one another as well as their assigned Vig-advantages, even as assigned on the fly of random algorithmic design by/for Housemasters.

Likewise, all methods for public access to the Applicants' No Dealer Hand gaming solution, be it some type of proprietary "live action", electronically processed video platform, or some type of wireless communications, mobile Internet devices or otherwise, clearly represents many of the presently known and anticipated deployment avenues for this game.

Therefore upon the booking of a required minimum contract wager and optional "Ante" wager Side-bets being offered, a new hand begins with the acquisition of the Player's first Two (2) hole-count cards. Next, each Player assesses their first two-cards to discover if a first two-card winning hand tally exists, including any two-card winning ancillary "Ante" wager Side-bets having been made, as shown in Step 3, of FIG. 2.

Figure 6:
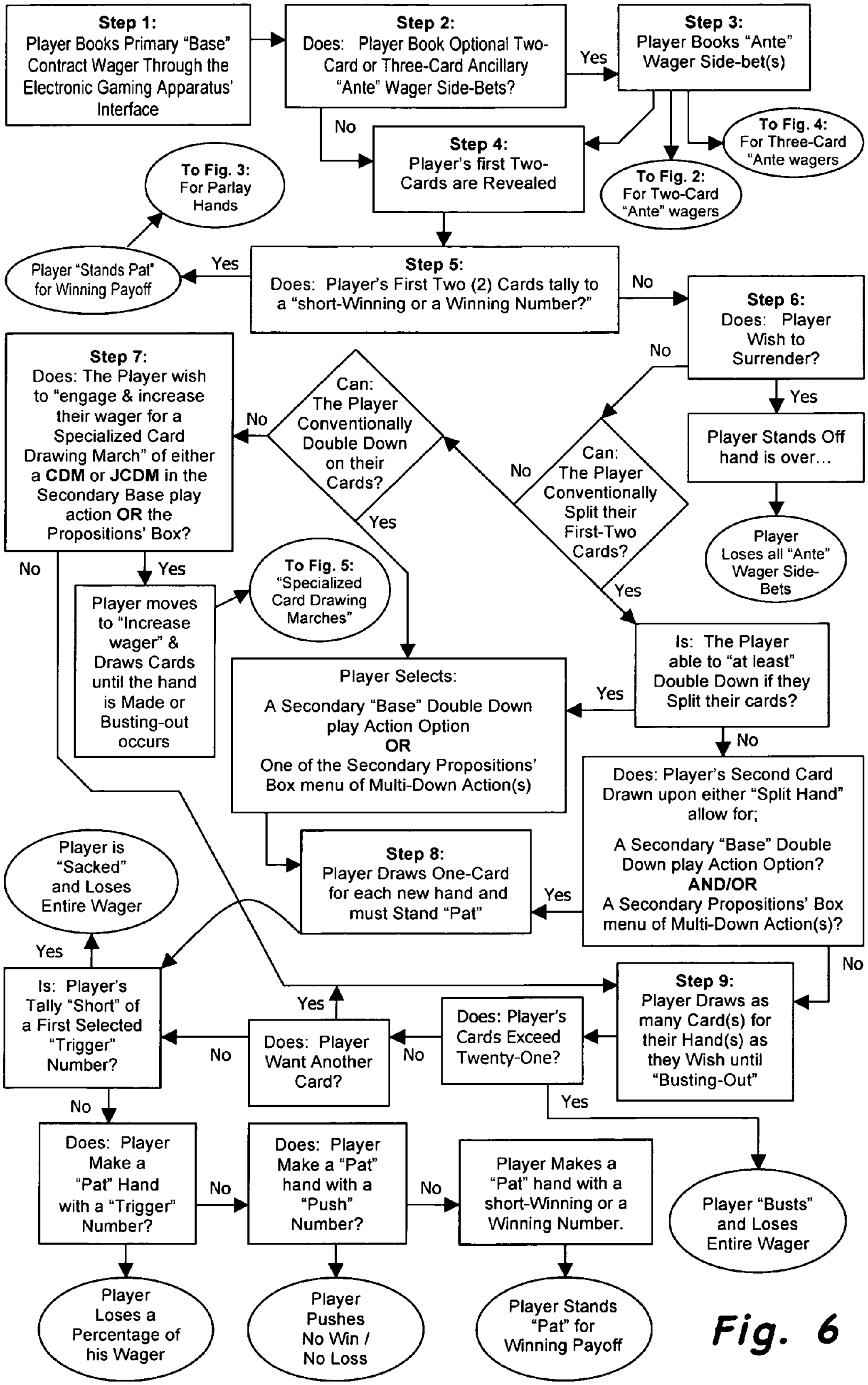
FIG. 6 Illustrates the detailed flow of progressive decisions/events to complete a round of play, for an electronic gaming process and/or any wireless device platforms for NDH/21.

If not, then a decision to Surrender may be considered should that option be available to the Player, as illustrated in Step 4, and Step 6, of FIGS. 1 & 6 respectively. In the absence of an immediate winning hand count outcome or a desire to Surrender their hand, Players will likely be compelled to draw at least One (1) card as to at least avoid being "sacked." Furthermore, on the one hand, since the Player's main motivation is to acquire a hand tally of at least a short-Winning Number, a Player might well bypass other play options drawing cards as they see fit without Busting to achieve such ends, as illustrated in FIGS. 1, 6, 7 & 8.

Indeed, on the other hand, the general decision to draw card(s) can come with additional possibilities for Players to either Split their cards, if; the Players holds a pair of equally valued cards, Double Down on their cards, assuming their first two-cards warrant such an action, or both Split and Double Down or even take similar actions for the higher risk/reward "winning" payoffs when booking upon the game's Multi-Down menu of Secondary Proposition wagers and options.

Of course, there remains a possible Power Parlay option to consider or too, even taking a periodic shot at one of the great "of-set Split-hand" options of the specialized CDM or JCDM, that are so inevitably unfolding from the shoes. Moreover, a CDM/JCDM play along with its Joker's Jackpot™ component being enabled, via the proper Ante-up wager being applied, works to prompt Players' qualified impulses, as so detailed and illustrated in FIGS. 1, 3, 5, 5*a*, 6 & 7.

FIGS. 1, 3, 5, 5*a*, 6, 7 & 8, clearly show the flow of progressive events illustrating the Player's options to draw card(s) as they see fit without Busting, as well as the Player's incumbent need to "Stand Pat" if the Player draws the One (1), and typically only One (1) card allowed for either an initial Secondary Base Double Down and/or Secondary Prop-Box's Multi-Down action(s).

Figure 4:
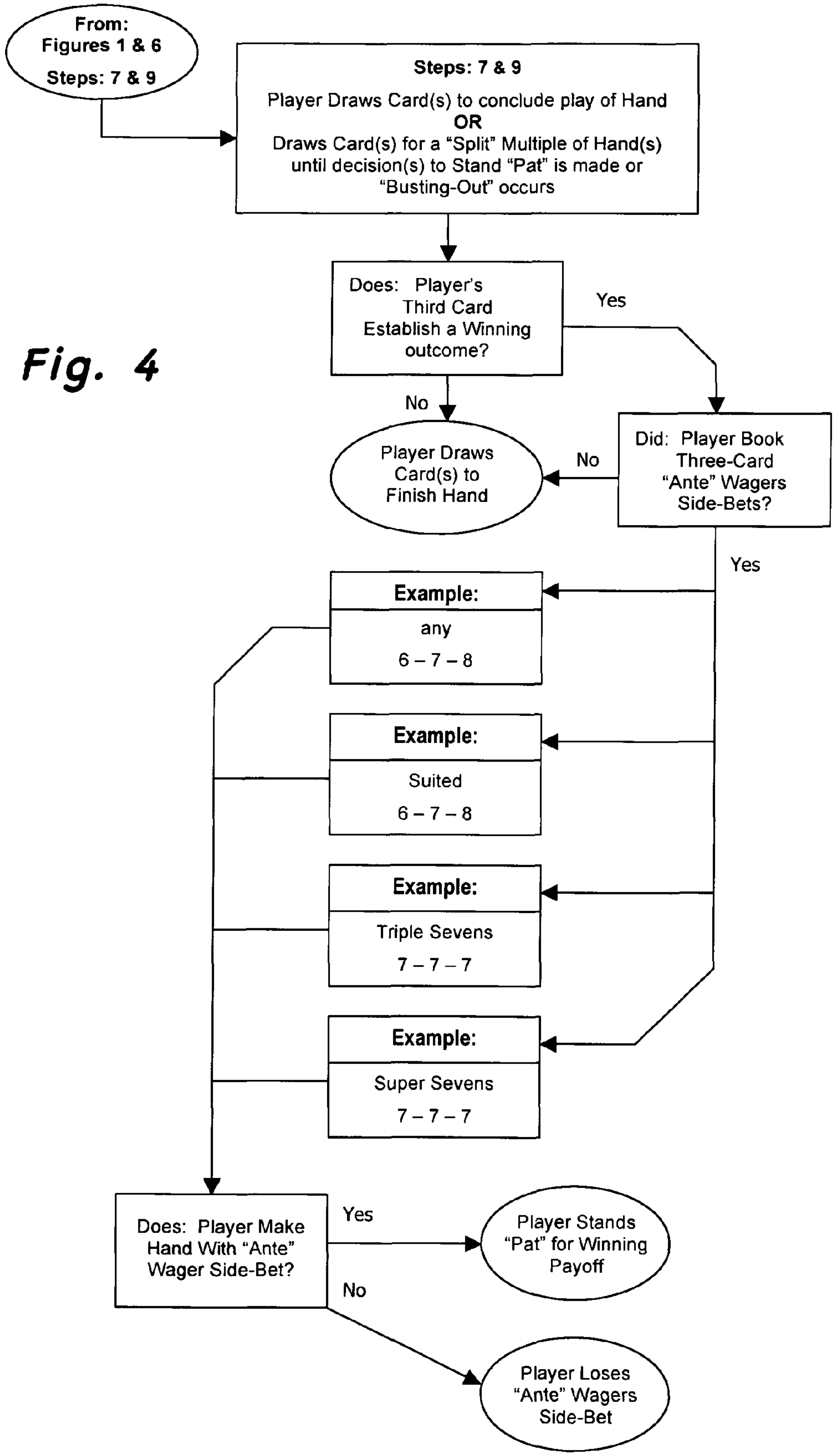
FIG. 4 Illustrates some of the many possible, first-three-card "Ante" type wager Side-bets.
Figure 5:
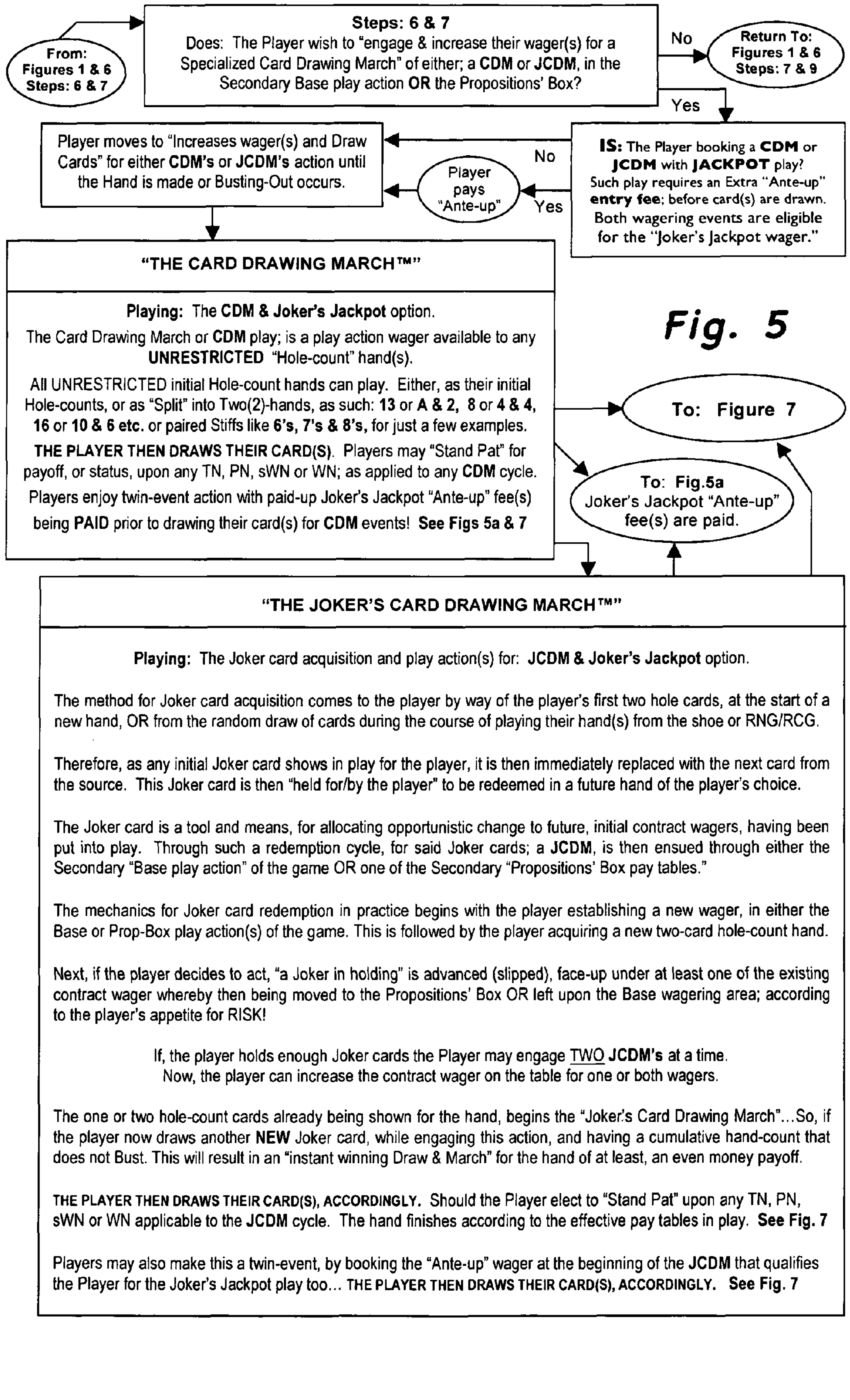
FIG. 5 Illustrates the detailed means and methods for engaging the CDM & JCDM wagers.
Figure 5A:
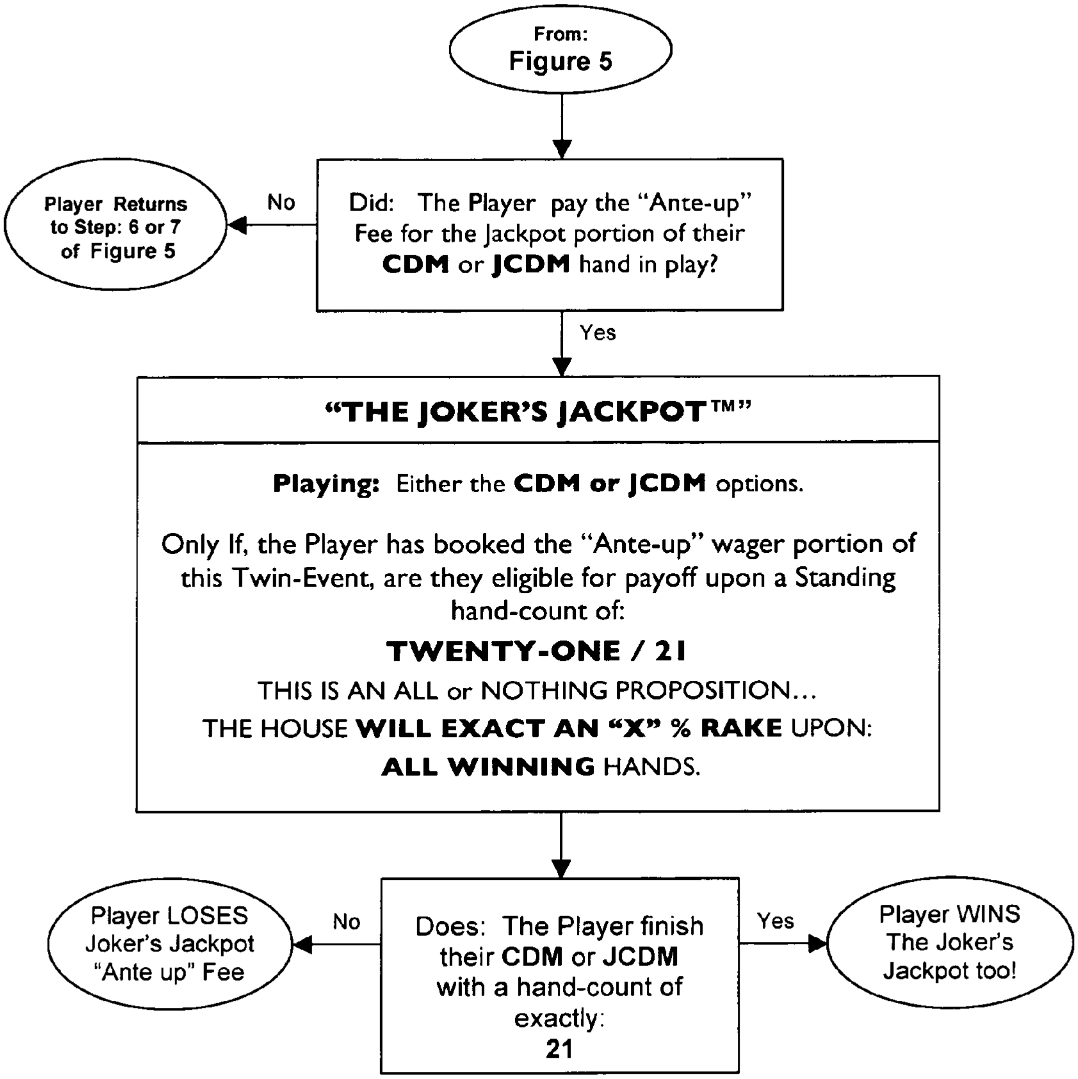
FIG. 5*a* Illustrates the detailed means and methods for engaging the "Joker's Jackpot™" wager.

Additionally, since a winning hand count tally often shows upon the draw of a Third-card, play action can also be inclusive of a Three-card ancillary Ante wager Side-bet if initially booked, as illustrated in Step 7, of FIG. 4, respectively.

Figure 7:
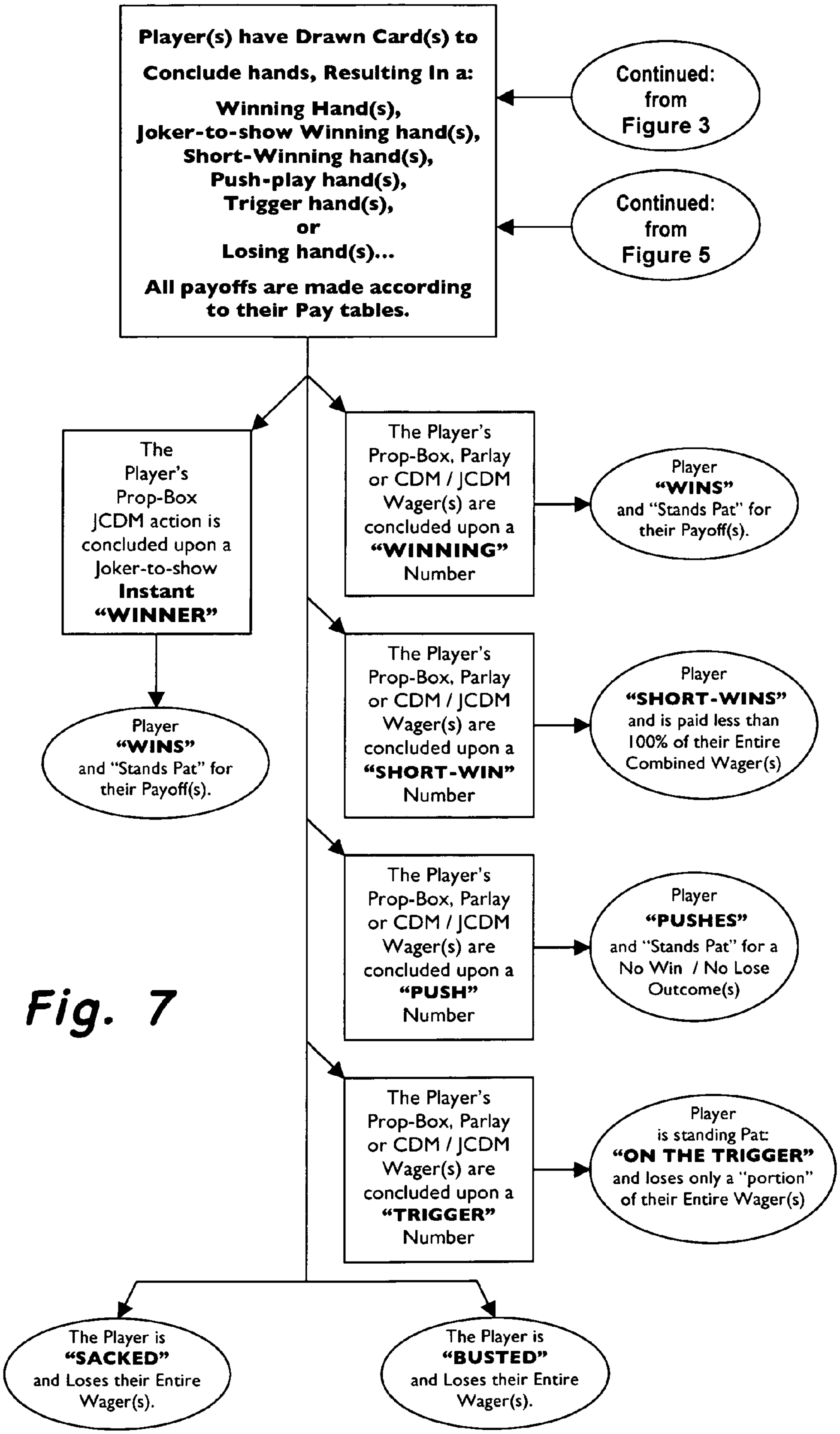
FIG. 7 Illustrates the "Power Parlay,™" CDM & JCDM flow of Outcome events for NDH/21.
Figure 8:
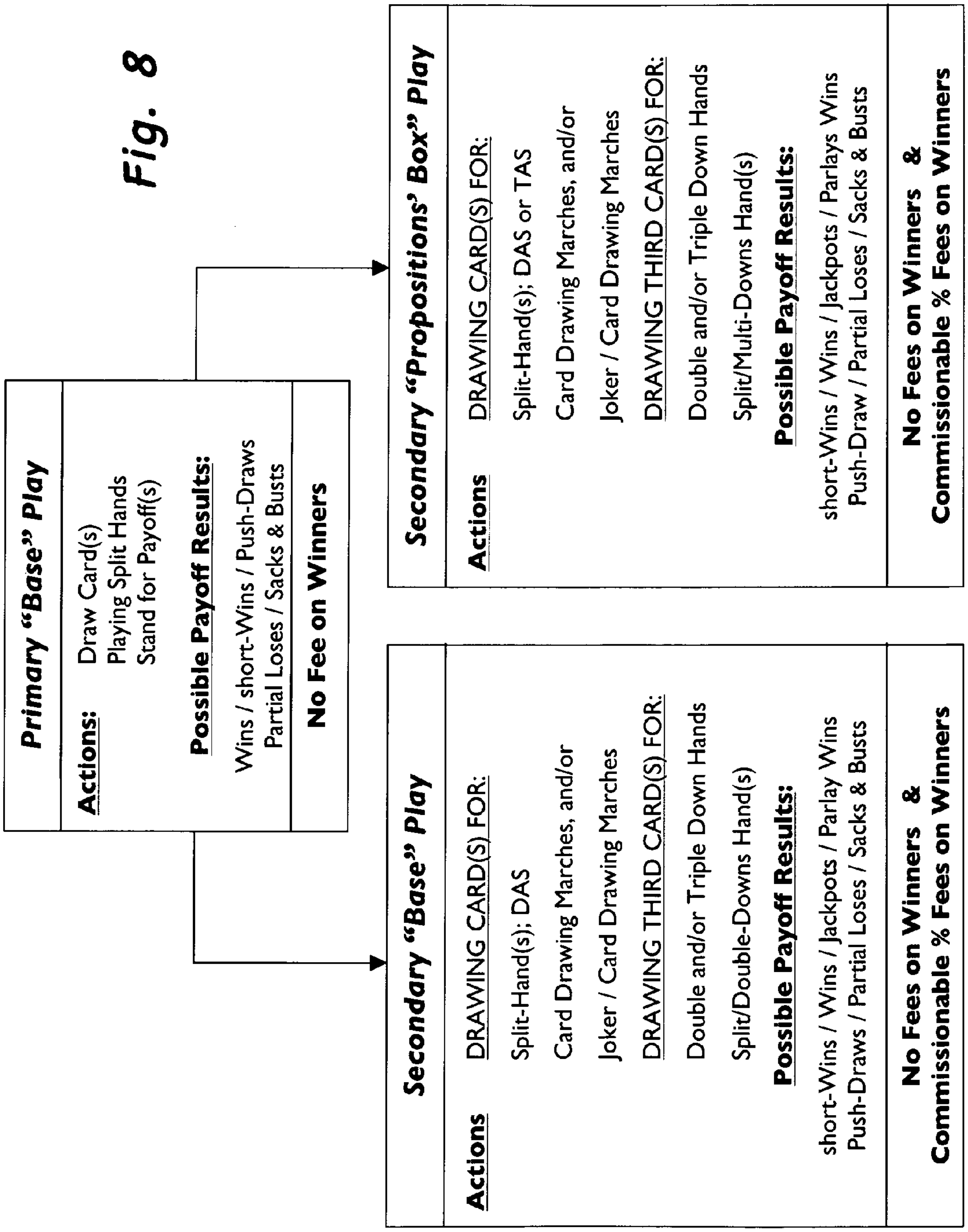
FIG. 8 Illustrates the Primary & Secondary Decisions' menu of actions for NDH/21.

Consequently, FIGS. 1, 6 & 7 also illustrate the consequences of not acquiring a winning hand. As clearly affirmed, if a Player Stands Pat with a hand count tally "short" of a first triggering event being applied to any play action that is of either a Primary or Secondary Base play action variety or as applied upon any type of Secondary Decisions' play action process; including all forms of Split-hand Parlay plays and/or CDM's, then Players are "Sacked," and lose their entire contract wager as well as any ancillary Ante wager Side-bets for the hand they may have booked.

Or, if a Player "Stands Pat" upon a hand count tally of a Trigger Number being applied, such Players will lose a "hefty percentage portion" of their contract wagers at risk. And, if Players Stand Pat on a hand count tally of an optional Push Number being applied, such circumstance resolves the Player's hand count tally as a "Push," again meaning a "no win/no lose" outcome for the hand, thereby leaving all short-Winning Number or Winning Number outcomes to be awarded according to their predetermined payoffs, notwithstanding the incumbent need to acquire a final hand-count of "21" to win;

a full Card Drawing March™ payoff, along with any applicable jackpots while Busting-out as a total loss, all hand count tallies "over 21."

Finally, FIG. 9*a* through 11*c* respectively, provide "Exemplary Counsel Embodiments" that unequivocally guide the Applicants' intentions for general play action of their No Dealer Hand "21" with Parlaying Propositions & Jackpots methodology.

Operational Advantages

Suffice it to say, there has never been the ability to establish such a generous menu of wagers with their payoff schedules within the core mathematical boundaries of traditional Blackjack. Neither have the Applicants ever personally seen, heard of, or read about the idea of or even the mere suggestion of applying a commissionable percentage fee—Vigorish, to be cast upon any class of wager being booked at a traditional Blackjack table, period.

Not to mention such a payoff schedule also being promulgated by way of the very core margin from a new mathematical formulation for "21" play action, being provided which classic Dealer-Hand Blackjack methodologies could never have envisioned, accommodated or sustained!

Clearly as the Applicants first discovered and then pursued their notions of using the "lousy Pat hands" of at first; Seventeen (17), Eighteen (18) and Nineteen (19) as "strategic replacements" for the sledge hammer effect of the dealer hand in play action, they too were surprised to see just how formidable the impact upon the integrated core mathematics was going to be, as well as what was to come from their rather "obscure differential formulation" of their triggering means solutions in play.

Remembering, that also affecting the Players of the Applicants' methodology is the wholly optional impact of Housemasters' aggregating use of differing types of decks, and/or shoe configurations, being offered and applied during the game's play. Moreover, as now clearly defined these aforementioned "modified decks" as applied for play action are envisioned as Carnival deck configurations, having Fifty (50) cards in play which would represent a "significantly fatter" House Vig-margin of a: "Y" value, to the "core mathematics for redistribution" to Players. Yet, Spanish configured decks, as applied with Forty-eight (48) cards in play, adds an even more generous Vig-margin to a: "Z" HA value for all of the same redistributive purposes.

As also discussed in detail within this disclosure, is the optional application and distribution of each deck's Two (2) Joker-cards. Manifestly, the use of Joker-cards usually is a problematic proposition, given their tendency to recklessly skew mathematical results, Historically, Joker-cards being used as random "wild-cards" has proven, more often then not, largely untenable . . . but for very limited use.

However, the Applicants have sequestered and tamed the Joker's ability to run, and play wild, in such a way as to make them by and large, mathematically impotent or inert, aside from their well defined roll(s).

In play action support of the Applicants' methods, Joker-cards operating within these deck configurations provide a clear measure of distance from the "core margin mathematics in their redistribution," while still effective in their duty to first prompt, then orchestrate Player participation; via the Applicants' finely tunable differential thread mix of ameliorating number agents, as applied into this new class JCDM wagers.

Furthermore, the Applicants' triggering means solution of differential number agents as thoroughly revealed and utilized, via the Applicants' NDH/21 methodologies and modifications, unlike all others coming before it, still provides a significant 50% increase in payoff for a WN outcome of Twenty-One. That is, both outcomes of either a Two-card "Natural" Blackjack or a multi-card Twenty-One (21) respectively, while optional Push Numbers represent a zero sum loss to the Players and Standing Pat upon applicable Trigger Numbers, "never results in the total loss" of a Player's contract wager having been made. And all this, is what operates from just the Primary Base play actions, and not to forget, the new introduction of short-Winning number's to boot!

Regarding the electronic modifications for play, additional advantages of the Applicants' process for playing No Dealer Hand 21, will become operational through the encompassing means of an ever modernizing interactive video gaming apparatuses, as provided for the game.

In considering the Applicants' modifications as applied to an electronic means for play, a "broader scale" of triggering number events (i.e, TNs, PNs, sWNs, WNs and the tactical use of Joker-cards) can be more fully utilized due to the fact that regulatory law and the core mathematics of the Applicants' methodologies function within an environment of broader mathematical opportunity, and the fact that in mobile wireless or video mode the Applicants' gaming process is engaged into a "real time computing environment" wherein the issuance of monetary units (i.e. credits in this case), and therefore their valuations are not so constricting upon the play-by-play action of the Applicants' process for play; meaning there are no human factors slowing the game to figure out what can now be a more "sensitive fractional, even 'mill-age' addition or deduction" to a Player's wager vs. payoff, when a decision to Stand Pat on the trigger from Twelve (12) up to Twenty (20) for example, is made and no human mistakes in calculating them are possible either! Therefore, a perfectly worthwhile process for engaging the Applicants' gaming modifications to the public will be provided through the means of a "multiPlayer community based and/or singularly intimate" electronic video display apparatus, wireless telecommunications device or the like.

In so doing, the aforementioned broader scale of triggering events; being Trigger Numbers, and/or Push Numbers, short-Winning & Winning Numbers could span a plurality of numbers comprising Twelve (12) up to Twenty-One (21) in a most sensitively balanced manner.

As such, the triggering number affect upon the Player within the bounds of an electronic version of the Applicants' gaming methodology could encompass for example, a Player loss of 100% on all hands under Twelve (12), and 100% loss on the actual 12; 100% on 13; 90% on 14; 80% on 15; 75% on 16 for all wagers at risk. Likewise, Players could "Push" on 17 & 18, while catching 50% of their wager on a "short-Win" of 19; 120% on certain 2/card 20's; 200% on Blackjack/21, and 150% on certain 3/card 21's for their wagers at risk, or any such kind of plurality mixture of numbers and percentages being applied.

In overview, we have here, a differential thread mix of numbers from Twelve up to Twenty-One, comprising a rather distinct solution for all triggering events in use, for this method. In even another example, the use of 12, 13, 14, 15 & 16, as both LN's & TN's. The use of 17 & 18, as PN's along with the use of: 19, 20 & 21, as sWN's & WN's or again, any plurality mix of numbers and percentages thereof, that can even fluctuate "on the fly" for manipulative play!

Similarly, there can be an entire Secondary selection of triggering events such as TNs, PNs, sWNs, WNs, and Joker-card applications, working across any of the Secondary Decisions' class/menu of wagers. Be they either, Base Double Down play actions, Secondary Propositions' Box Multi-Down play actions or again, any type of CDM, JCDM being applied as well.

However, if played within a third party's programmable electronic gaming apparatus for transmitting electronically simulated card values along with electronic wagering being made upon a virtual table's or screen's surfaces, supporting such electronic interactions among its Players, it is then axiomatic, that Housemasters would also require the use of state agency approved, electronic equipment. Today, such transformation of both means & methods for transmittance of software via computing equipment, is universally supported by numerous LAN/WAN networks, as being applied. Insofar as to include, Player input/output interfaces, video screens, combination sources of processing power, huge memory applications, including flash memory and the like, battery's of RAM, EEPROM, storage software, RNG's and a litany of protocal functions for deploying the Applicants' software in operations, not to mention an amass of security functions operating in real time too. These very transitioning capabilities and protocols are prevalent in their present day third party availabilities. Today, the Applicants' gaming methods can be transformed via a complete virtual reality platform for multi-Player action too, such as disclosed in (U.S. Pat. No. 6,607,443 to Miyamoto et. al.), for one example. The content of this very Patent, and the many others providing such methods and means, is hereby observed and incorporated by reference.

Another "value added" aspect of the video application process is the ability to string any number of video units and/or wireless hand held devices together across any geographical locality supporting any number of ancillary "Ante" wager type Side-bets, specialized "Ante-up" Jackpot Side-bets and/or batteries of progressive "Jackpot" opportunities across the LAN/WAN networks, not to mention all the tournament play possibilities . . . . NDH/21 makes for great spectator entertainment!

Most notably, the Applicants' triggering number events and the Joker-to-show process of play for JCDM's, provides for a key unexpected benefit for both Players and casinos alike, wherefore a credible balance between the casino's necessary House Vig-advantage and a Player's exposure to it, is definitely made a palatable one.

This is directly due to the ameliorating manipulations of the entirety of the Applicants' differential thread mix of numbers in play, as Primary and/or Secondary Base & Proposition Trigger Number selections and/or group/sets, Primary and/or Secondary Base & Proposition Push Number selections and/or group/sets, as well as the short-Winning & Winning Number selections and/or group/sets as has been so thoroughly described and illustrated above, therein producing a ready potential for much improved payoff ratios from this newly presented core thread methodology.

As for the gaming industry, casinos can once again offer their patrons an exciting "companion" option to traditional Blackjack, as being encompassed within a video package, that is quite capable of taking on the vast market dominance of video Poker; that is simple to grasp, fast to play, and will prove to be even more generous to their patron's Time-In-Play.

Likewise, the Applicants' process of play either in its table gaming format or its interactive electronic formats, provides solutions that not only supports richer incentives for a patron's play action, but indeed, the Applicants' methodology will very likely simultaneously propagate a significantly "fatter" Win % value for Housemasters as well, by drawing out much larger sums of capital across its play action environment(s) in even shorter spans of time.

Another significant result of the Applicants' process for No Dealer Hand "21" works to restrain the affect of card counting by "directly frustrating" the practical functionality and application of known card counting techniques and strategies due to the "direct extraction of the 'dealer hand affect' upon the game." And, this is further complemented by the speedy characteristics of the Applicants' combined methodologies, and play action game pace!

Also, benefiting Housemasters when moving forward with the Applicants' gaming process is the quality, and therefore value, weight & impact of the organized "group think" presently being propagated by the "Basic Strategy & Advantage Player classes" upon the traditional Blackjack franchise that is now largely frustrated, yet not entirely, reduced to guessing . . . .

To appreciate this is to know that the Player's relationship to the cards is now truly "more than less a 'static' one," to the Six (6), Eight (8) or whatever number of deck shoe being used, and not to the "dealer's hand affect" directly. An affect, that represents the most salient purpose for and focus upon, essentially every effective card counting system known.

Moreover, from the Player's continuum perspective, the Applicants' featured solutions advocating a "No Dealer Hand" play action approach to the game, at long last, satiates the single greatest long suffering problem engulfing the typical Players' play of classic Blackjack. That long suffering problem being, the Players' perceived chances of surviving the continuum's unending onslaught of Player Stiff-hands, as further complicated by "detestably hot" Blackjack dealer hands; because now, there isn't one . . . .

Accordingly, the present invention has been described with respect to specific methods & modifications, and a few effective counsel embodiments having been illustrated. Likewise, it will be understood that various changes and modifications will be suggested by those who are skilled in the art therefore it is the intent of the Applicants' to anticipate such changes and modifications as falling within the scope of the appended claims.

We claim:

1. A method for distributing affiliated wagers in support of a modified twenty-one style gaming process having a no-dealer-hand means being deployed, therein supporting various enacting means and methods for providing player access to play, including as being transitioned into play action, via programmable electronic gaming apparatuses for transmitting any acceptable configuration of electronically simulated card play, directly benefiting housemasters and players thereof, further comprising:

said method for distributing affiliated wagers in support of said modified twenty-one style gaming process, utilizing said no-dealer-hand means for play action, as then being replaced by a triggering means solution for processing, said play action via a differential number thread mix consortium of triggering number agents being used in place of said dealer's hand, as said modified twenty-one style gaming process is further transitioned into play, via said means of programmable electronic gaming apparatuses for transmitting and displaying any acceptable configuration of electronically simulated card values, as programmed and conveyed for, wherein the electronic gaming apparatuse's bill acceptor contracts play action after accepting currency or credits thereof, to enable the electronically simulated gaming action to occur;

with, said method for distributing affiliated wagers having each player in the game to book an initial primary base level contract wager, to then have said each player to receive two electronically simulated card values, of an initial two-card hole-count hand tally, for what will become at least, said initial primary base level play action hand, or even manifesting into a secondary base level play action hand, of up to twenty-one;

also, said methods for transmitting such gaming processes, as being transitioned into by way of the electronic simulation of its card play, will then have said each player assessing said simulated card values representing said initial two-card hole-count hand tallies for a decision to either stand pat upon the presented two-card outcome, or to draw additional said simulated card values in pursuit of at least, said initial primary base level play actions;

while, further operating a secondary decisions' fork means and menu of expanded wagering options for assessing play action decisions to complete said play, via either said secondary base level play actions, or selecting from a new panoply of proprietary wagering events underlying the game's said secondary decisions' fork means for play, as transitioned into, by way of said electronic simulation of its card play as being conveyed to said players thereof, prior to said each player's further drawing of any third-cards, whereby providing an immediately increased degree of elevated risk and reward for play within the game's play action methods being made available for use;

and, having said secondary decisions' fork means and menu of expanded wagering options for selecting from said new panoply of proprietary wagering events underlying said game's secondary decisions' fork means for play, as transitioned into, by way of said electronic simulation of it's card play, to convey an optional parlay-replay process of wagering via the means of a unique parlay blackjack replay event for drawing upon any player's newly won hole-count blackjack hand of a ten, and ace card thereof, being split into two new hands for being rewagered and replayed starting as a ten-count hand, and an eleven-count hand, whereby being immediately replayable within said game's methods, following the payoff of said player's initial blackjack outcome hand starting a round of play.

2. The methods of claim 1, further comprising said secondary decisions' fork means and menu of expanded wagering options underlying said game's methods for play, as transitioned into, by way of said electronic simulation of it's card play, to include the conveyance of a reciprocal parlay-replay process via the means of a unique parlay twenty replay event for drawing upon a player's newly won hole-count twenty hand of two ten-count cards thereof, being split into two new hands, to be rewagered and replayed starting as two new ten-count hands, whereby being immediately replayable therefrom, via said game's play action application of said triggering means solution for processing said differential number thread mix consortium of triggering number agents being used in place of said dealer's hand, following the payoff of said player's initial hole-count twenty outcome hand starting said round of play.

3. The methods of claim 1, further comprising said secondary decisions' fork means and menu of expanded wagering options underlying said game's methods for play, as transitioned into, by way of said electronic simulation of it's card play, to include the conveyance of a new single handed or split-handed wagering process via the means of a specialized card-drawing-march event for the players thereof, that too, commences only after said players have seen said initial two-card hole-count hand having been dealt them for pursuing either an initial two-card single hand event, an initial matched pair split-handed event or even an initial two-card off-set split-handed event, whereby being immediately replayable therefrom, via said game's play action application of said triggering means solution for processing said differential number thread mix consortium of triggering number agents being used in place of said dealer's hand, prior to said players further drawing of any said third-cards during said round of play.

4. The methods of claim 3, further comprising said secondary decisions' fork means and menu of expanded wagering options underlying said game's methods for play, as transitioned into, by way of said electronic simulation of it's card play, to include the conveyance of said new single handed or split-handed wagering process via the means of a specialized joker-card-drawing-march event for said players thereof, that too, commences only after said players have seen said initial two-card hole-count hand having been dealt them for pursuing either said initial two-card single hand event, said initial matched pair split-handed event or even said initial two-card off-set split-handed event, whereby being immediately replayable therefrom, via said game's play action application of said triggering means solution for processing said differential number thread mix consortium of triggering number agents being used in place of said dealer's hand, prior to said players further drawing of any said third-cards during said round of play.

5. The methods of claim 3, further comprising said secondary decisions' fork means and menu of expanding wagering options underlying said game's methods for play, as transitioned into, by way of said electronic simulation of it's card play, to include the conveyance of said new single handed or split-handed wagering processes via the means of any card-drawing-march or joker-card-drawing-march events, being further aimed at enticing said players thereof, into affording access into the means of a bonus jackpot wagering option for play action, benefiting all said players entering any type of said card-drawing-march events for which the means of entering said bonus jackpot wagering option for play only occurs prior to said players further drawing of any said third-cards during said round of play.

6. The methods of claim 5, further comprising said secondary decisions' fork means and menu of expanding wagering options underlying said game's methods for play, as transitioned into, by way of said electronic simulation of it's card play, to include the conveyance of said new optional wagering events that may require entry ante fees from said players thereof, that further allows eligible players having already paid said required ante-up fees to access the additional said bonus jackpot option prior to commencing play action for either type of said card-marching means for play, which can only occur prior to said players further drawing of any third-cards for play action.

7. The methods of claim 1, further comprising said modified twenty-one style gaming processes including various means and methods for distributing affiliated wagers while operating a simultaneous secondary decisions' fork and menu of expanded wagering options underlying said game's methods for utilizing said no-dealer-hand means for play, as then being replaced by said triggering means solution for processing said differential number thread mix consortium of triggering number agents being used in place of said dealer's hand, as also being proffered, and transitioned into play via a number of other player option formats, from table games to wireless hand-held devices, underlying said various enacting means and methods for decisive player access.

* * * * *